United States Patent
Blank et al.

(10) Patent No.: US 10,437,243 B2
(45) Date of Patent: *Oct. 8, 2019

(54) COMBINE HARVESTER CONTROL INTERFACE FOR OPERATOR AND/OR REMOTE USER

(71) Applicant: Deere & Company, Moline, IL (US)

(72) Inventors: Sebastian Blank, Bettendorf, IA (US); Mario L. Donini, Bettendorf, IA (US); Dohn W. Pfeiffer, Bettendorf, IA (US); Joshua D. Hoffman, Bettendorf, IA (US)

(73) Assignee: Deere & Company, Moline, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/626,967

(22) Filed: Jun. 19, 2017

(65) Prior Publication Data

US 2018/0364698 A1    Dec. 20, 2018

(51) Int. Cl.
*G06F 3/048* (2013.01)
*G06F 3/0485* (2013.01)
(Continued)

(52) U.S. Cl.
CPC ......... *G05D 1/0016* (2013.01); *A01D 41/127* (2013.01); *A01D 41/1278* (2013.01);
(Continued)

(58) Field of Classification Search
CPC .................. G06F 3/04883; G06F 2203/04101
See application file for complete search history.

(56) References Cited

U.S. PATENT DOCUMENTS 4,951,031 A * 8/1990 Strubbe .............. A01D 41/1273
340/684
5,585,757 A   12/1996 Frey
(Continued)

FOREIGN PATENT DOCUMENTS

EP    1111550 A1    6/2001
EP    1714822 A2    10/2006
(Continued)

OTHER PUBLICATIONS

Combine Harvester Instrumentation System for Use in Precision Agriculture, Yap Kin, 2011.*
(Continued)

*Primary Examiner* — Rayeez R Chowdhury
(74) *Attorney, Agent, or Firm* — Joseph R. Kelly; Kelly, Holt & Christenson PLLC

(57) ABSTRACT

A user device, that is remote from a combine harvester, communicates with a remote system to receive performance metrics corresponding to sensed operation of a plurality of different combine harvesters. A performance display element, for each machine, and for each of a plurality of different performance criteria, is generated. Display control logic controls a display device so the performance display elements are displayed with display elements corresponding to a same performance criteria, but for different combine harvesters, being displayed adjacent one another, on the display device. The display control logic also controls the display device so the performance machine display elements for the plurality of different combine harvesters are also displayed along with a performance distribution display element that represents a performance distribution of a plurality of different machines.

13 Claims, 23 Drawing Sheets

(51) Int. Cl.
*G05D 1/00* (2006.01)
*A01D 41/127* (2006.01)
*G06T 11/20* (2006.01)
*G06F 3/0488* (2013.01)
*G06Q 10/06* (2012.01)

(52) U.S. Cl.
CPC ........ *G06F 3/0485* (2013.01); *G06F 3/04883* (2013.01); *G06Q 10/06* (2013.01); *G06Q 10/0639* (2013.01); *G06T 11/206* (2013.01); *G06T 2200/24* (2013.01)

(56) References Cited

U.S. PATENT DOCUMENTS

| | | | |
|---|---|---|---|
| 5,679,094 | A | 10/1997 | Nakamura et al. |
| 5,734,849 | A | 3/1998 | Butcher |
| 5,751,199 | A | 5/1998 | Shiau et al. |
| 5,755,281 | A | 5/1998 | Kang et al. |
| 6,449,932 | B1 | 9/2002 | Cooper et al. |
| 6,990,459 | B2 | 1/2006 | Schneider |
| 6,999,877 | B1 | 2/2006 | Dyer |
| 7,047,135 | B2 | 5/2006 | Dyer |
| 7,184,892 | B1 | 2/2007 | Dyer |
| 7,333,922 | B2 | 2/2008 | Cannon |
| 7,397,392 | B2 | 7/2008 | Mahoney et al. |
| 8,280,595 | B2 | 10/2012 | Foster et al. |
| 8,469,784 | B1 * | 6/2013 | Hoskinson ........... A01D 41/127 460/1 |
| 9,892,376 | B2 | 2/2018 | Pfeiffer et al. |
| 10,310,455 | B2 | 6/2019 | Blank |
| 10,310,456 | B2 | 6/2019 | Blank |
| 10,311,527 | B2 | 6/2019 | Pfeiffer |
| 2002/0040300 | A1 | 4/2002 | Ell |
| 2002/0103688 | A1 | 8/2002 | Schneider |
| 2005/0150202 | A1 * | 7/2005 | Quick ................. A01D 41/127 56/10.2 R |
| 2005/0171660 | A1 | 8/2005 | Woolford et al. |
| 2005/0171835 | A1 | 8/2005 | Mook et al. |
| 2005/0258259 | A1 | 11/2005 | Stanimirovic |
| 2006/0187048 | A1 | 8/2006 | Curkendall |
| 2006/0241838 | A1 | 10/2006 | Mongiardo et al. |
| 2006/0293913 | A1 | 12/2006 | Iwig |
| 2007/0192173 | A1 | 8/2007 | Moughler et al. |
| 2008/0319927 | A1 | 12/2008 | Dellmier et al. |
| 2009/0036184 | A1 | 2/2009 | Craessaerts et al. |
| 2009/0259483 | A1 | 10/2009 | Hendrickson et al. |
| 2009/0312919 | A1 | 12/2009 | Foster |
| 2010/0036696 | A1 | 2/2010 | Lang |
| 2010/0153409 | A1 | 6/2010 | Joshi |
| 2010/0199257 | A1 | 8/2010 | Biggerstaff |
| 2010/0217631 | A1 | 8/2010 | Boss et al. |
| 2011/0251752 | A1 | 10/2011 | DeLarocheliere et al. |
| 2012/0215395 | A1 | 8/2012 | Aznavorian et al. |
| 2012/0253744 | A1 | 10/2012 | Schmidt |
| 2012/0260366 | A1 | 12/2012 | Heuvelmans |
| 2012/0323453 | A1 | 12/2012 | Havimaki et al. |
| 2012/0323496 | A1 | 12/2012 | Burroughs et al. |
| 2013/0317872 | A1 | 11/2013 | Nakamichi |
| 2014/0019018 | A1 | 1/2014 | Baumgarten |
| 2014/0025440 | A1 | 1/2014 | Nagda et al. |
| 2014/0069035 | A1 | 3/2014 | Jericho |
| 2014/0089035 | A1 * | 3/2014 | Jericho ................. G07C 5/008 705/7.26 |
| 2014/0122147 | A1 * | 5/2014 | Christie ................. G06Q 50/02 705/7.15 |
| 2014/0129048 | A1 | 5/2014 | Baumgarten et al. |
| 2014/0156105 | A1 | 6/2014 | Faivre et al. |
| 2014/0188576 | A1 | 7/2014 | de Oliveira et al. |
| 2014/0172247 | A1 | 9/2014 | Thomson |
| 2015/0064668 | A1 | 3/2015 | Manci et al. |
| 2015/0112546 | A1 | 4/2015 | Ochsendorf et al. |
| 2015/0199360 | A1 | 5/2015 | Pfeiffer et al. |
| 2015/0178661 | A1 | 6/2015 | Keaveny et al. |
| 2015/0199637 | A1 | 7/2015 | Pfeiffer et al. |
| 2015/0199775 | A1 | 7/2015 | Pfeiffer et al. |
| 2015/0365124 | A1 | 12/2015 | Kremmer |
| 2015/0366124 | A1 | 12/2015 | Kremmer |
| 2016/0088793 | A1 | 3/2016 | Bischoff |
| 2016/0098637 | A1 | 4/2016 | Hodel et al. |
| 2017/0168501 | A1 | 6/2017 | Ogura |
| 2017/0261978 | A1 | 9/2017 | Gresch |
| 2017/0322550 | A1 | 11/2017 | Yokoyama |
| 2018/0196438 | A1 | 7/2018 | Newlin |
| 2018/0359917 | A1 * | 12/2018 | Blank .................. A01D 41/127 |

FOREIGN PATENT DOCUMENTS

| | | |
|---|---|---|
| EP | 3346347 A1 | 11/2018 |
| WO | 2013096716 A2 | 6/2013 |
| WO | 2013096721 A2 | 6/2013 |
| WO | 2015153809 A1 | 10/2015 |
| WO | 2016153809 A1 | 10/2015 |
| WO | 2016116499 A1 | 7/2016 |
| WO | 2016200699 A1 | 12/2016 |

OTHER PUBLICATIONS

U.S. Appl. No. 14/925,237 Final Office Action dated Nov. 5, 2018, 30 pages.
European Patent Application No. 18176691.6-1217 Extended European Search Report dated Oct. 25, 2018, 8 pages.
U.S. Appl. No. 14/445,699, filed Jan. 14, 2014 Prosecution History as of Nov. 2, 2017, 158 pages.
U.S. Appl. No. 14/271,077, filed May 6, 2014 Prosecution History as of Oct. 10, 2017, 122 pages.
U.S. Appl. No. 14/546,725, filed Nov. 18, 2014, Prosecution History as of Oct. 11, 2017, 181 pages.
European Search Report Application No. 14879223.7 dated May 22, 2017, 7 pages.
U.S. Appl. No. 14/155,023, filed Jan. 14, 2014, Prosecution History as of Nov. 2, 2017, 159 pages.
U.S. Appl. No. 14/925,237, filed Oct. 28, 2015, Prosecution History as of Oct. 11, 2017, 122 pages.
U.S. Appl. No. 15/626,934, filed Jun. 19, 2017, Application and Drawings, as of Jul. 17, 2017, 68 pages.
Electronic Fleet Management for Work Truck Fleets, Jun. 20, 2013 2 pages. www.zonarsystems.com.
2013 Buyers Guide: Fleet Automation Software, http://www.teletrac.com/assets/TT_BuyersGuide_2013.pdf, 10 pages.
Fleet Management: How it works. 2014 Verizon. 3 pages.
International Search Report and Written Opinion for International Application No. PCT/US2014/069541, dated Apr. 15, 2015, date of filing: Dec. 10, 2014, 17 pages.
U.S. Appl. No. 15/629,260, filed Jun. 19, 2017, Application and Drawings, as of Jun. 21, 2017, 157 pages.
U.S. Appl. No. 14/546,725 Office Action dated May 11, 2018, 18 pages.
U.S. Appl. No. 14/445,699 Office Action dated Jul. 20, 2018, 70 pages.
U.S. Appl. No. 15/626,260 Prosecution History as of Mar. 12, 2018, 64 pages.
U.S. Appl. No. 14/271,077 Office Action dated Oct. 2, 2018, 10 pages.
U.S. Appl. No. 14/546,725 Office Action dated Oct. 11, 2018, 11 pages.
U.S. Appl. No. 15/626,967 Notice of Allowance dated Jan. 3, 2019, 6 pages.
Extended European Search Report Application No. 13176687.4 dated Nov. 5, 2018, 6 pages.
Chinese Patent Application No. 201469068106.2, dated Oct. 8, 2018, 12 pages.
U.S. Appl. No. 14/445,699 Final Office Action dated Mar. 6, 2019, 66 pages.
U.S. Appl. No. 15/626,972 Office Action dated Apr. 19, 2019, 14 pages.
U.S. Appl. No. 14/271,077 Notice of Allowance dated Jun. 19, 2010, 7 pages.

(56) References Cited

OTHER PUBLICATIONS

U.S. Appl. No. 14/445,699 Final Office Action dated Mar. 6, 2019, 66 pages.

* cited by examiner

COMBINE HARVESTER CONTROL INTERFACE FOR OPERATOR AND/OR REMOTE USER

FIELD OF THE DESCRIPTION

The present description relates to a control interface for an agricultural machine. More specifically, the present description relates to a control interface for an operator of a combine harvester and/or for a remote operator.

BACKGROUND

There are a wide variety of different types of equipment, such as construction equipment, turf management equipment, forestry equipment, and agricultural equipment. These types of equipment are operated by an operator. For instance, a combine harvester (or combine) is operated by an operator, and it has many different mechanisms that are controlled by the operator in performing a harvesting operation. The combine may have multiple different mechanical, electrical, hydraulic, pneumatic, electromechanical (and other) subsystems, some or all of which can be controlled, at least to some extent, by the operator. The systems may need the operator to make a manual adjustment outside the operator's compartment or to set a wide variety of different settings and provide various control inputs in order to control the combine. Some inputs not only include controlling the combine direction and speed, but also threshing clearance and sieve and chaffer settings, rotor and fan speed settings, and a wide variety of other settings and control inputs.

Because of the complex nature of the combine operation, it can be very difficult to know how a particular operator or machine is performing in a given harvesting operation. While some systems are currently available that sense some operational and other characteristics, and make them available to reviewing personnel, those current systems are normally informational in nature.

The discussion above is merely provided for general background information and is not intended to be used as an aid in determining the scope of the claimed subject matter.

SUMMARY

A user device, that is remote from a combine harvester, communicates with a remote system to receive performance metrics corresponding to sensed operation of a plurality of different combine harvesters. A performance display element, for each machine, and for each of a plurality of different performance criteria, is generated. Display control logic controls a display device so the performance display elements are displayed with display elements corresponding to a same performance criteria, but for different combine harvesters, being displayed adjacent one another, on the display device. The display control logic also controls the display device so the performance display elements for the plurality of different combine harvesters are also displayed along with a performance distribution display element that represents a performance distribution of a plurality of different machines. Control inputs are actuated to perform control operations.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Combine harvesters often have a wide variety of sensors that sense a variety of different variables, such as operating parameters, along with crop characteristics, environmental parameters, etc. The sensors can communicate this information over a controller area network (CAN) bus (or another network, such as an Ethernet network, etc.) to various systems that can process the sensor signals and generate output signals (such as control signals) based on the sensed variables. Given the complex nature of the control operations needed to operate a combine harvester, and given the wide variety of different types of settings and adjustments that an operator can make, and further given the widely varying different types of crops, terrain, crop characteristics, etc. that can be encountered by a combine harvester, it can be very difficult to determine how a particular machine, or operator, is performing. This problem is exacerbated when a particular organization has a plurality of different combine harvesters that are all operating at the same time. These combine harvesters are often referred to as a "fleet" of harvesters.

The operation of the fleet of harvesters is often overseen by a (remote or local) fleet manager (or farm manager) who is located remotely relative to at least some of the combine harvesters in the fleet. It can be extremely difficult for a farm manager or remote manager to determine how the various combine harvesters are operating in the fleet, how they are operating relative to one another, how they are operating relative to other similarly situated harvesters, etc.

It is also extremely difficult for a remote manager to identify performance criteria for the various operators and machines, and determine how they compare relative to one another, in near real time. Thus, it is very difficult for a remote manager to attempt to modify the settings on any combine harvester to increase the performance of that harvester. This is because the remote manager does not have access to the current settings of a particular machine, nor does the remote manager have access to an interface that allows the remote manager to view and interact with display elements that indicate how various machines and operators are performing relative to one another.

Instead, the remote manager often needs to review data after the harvesting season, and even then the task is difficult. The remote manager often needs to switch between different applications, between different views of data, for the different machines and operators, in an attempt to compare the data in this way. This results in a relatively large amount of bandwidth consumption, because the operator often needs to make many different calls from his or her device to a remote data store where the information is stored.

Some systems currently allow remote viewing of settings, to some extent. One drawback is the delay time involved. In current systems, there may be a delay of thirty minutes or more.

Figure 1:
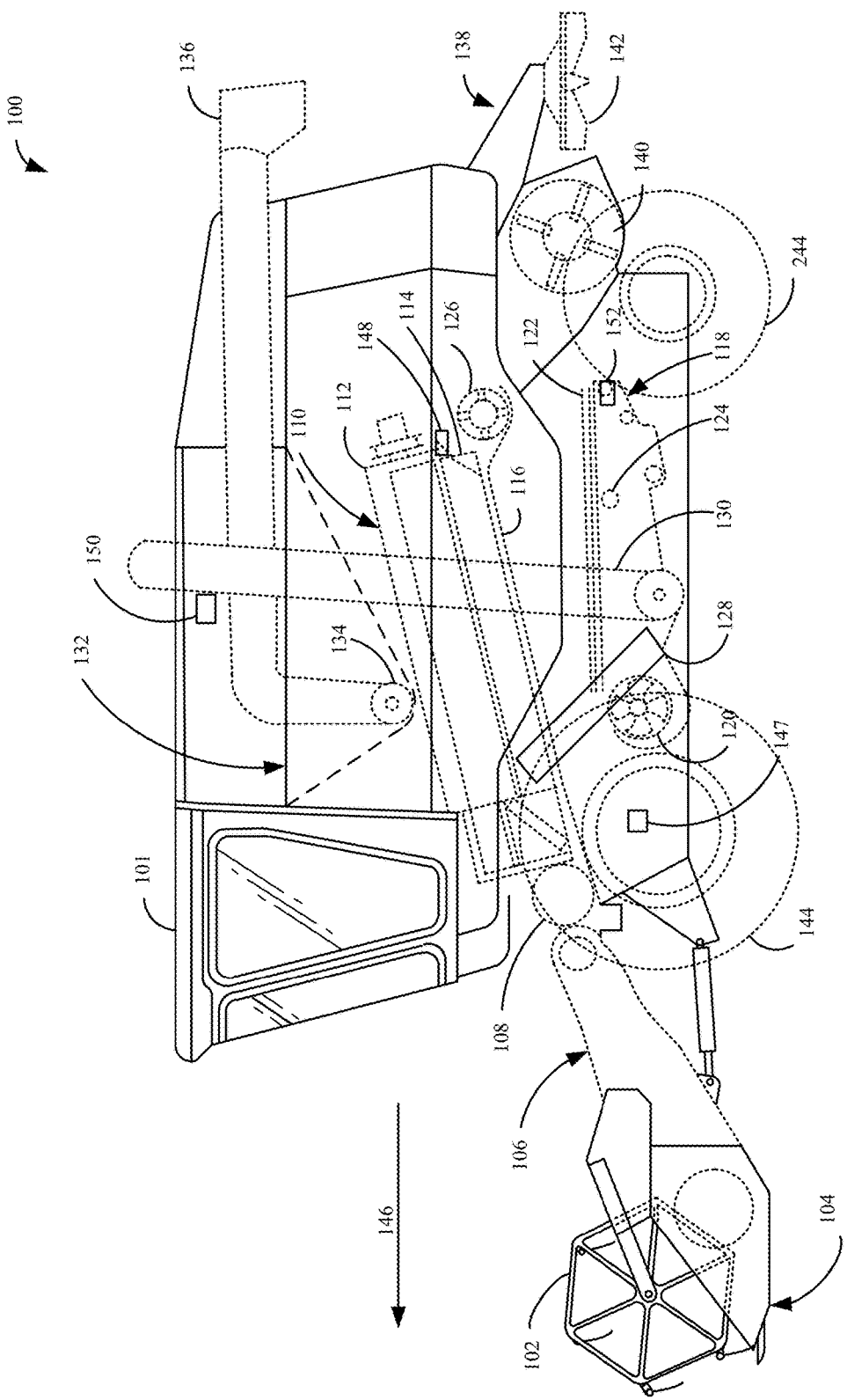
FIG. 1 is a partial pictorial, partial schematic illustration of a combine harvester.

FIG. 1 is a partial pictorial, partial schematic, illustration of an agricultural machine 100, in an example where machine 100 is a combine harvester (or combine). It can be seen in FIG. 1 that combine 100 illustratively includes an operator compartment 101, which can have a variety of different operator interface mechanisms, for controlling combine 100, as will be discussed in more detail below. Combine 100 can include a set of front end equipment that can include header 102, and a cutter generally indicated at 104. It can also include a feeder house 106, a feed accelerator 108, and a thresher generally indicated at 110. Thresher 110 illustratively includes a threshing rotor 112 and a set of concaves 114. Further, combine 100 can include a separator 116 that includes a separator rotor. Combine 100 can include a cleaning subsystem (or cleaning shoe) 118 that, itself, can include a cleaning fan 120, chaffer 122 and sieve 124. The material handling subsystem in combine 100 can include (in addition to a feeder house 106 and feed accelerator 108) discharge beater 126, tailings elevator 128, clean grain elevator 130 (that moves clean grain into clean grain tank 132) as well as unloading auger 134 and spout 136. Combine 100 can further include a residue subsystem 138 that can include chopper 140 and spreader 142. Combine 100 can also have a propulsion subsystem that includes an engine that drives ground engaging wheels 144 or tracks, etc. It will be noted that combine 100 may also have more than one of any of the subsystems mentioned above (such as left and right cleaning shoes, separators, etc.).

In operation, and by way of overview, combine 100 illustratively moves through a field in the direction indicated by arrow 146. As it moves, header 102 engages the crop to be harvested and gathers it toward cutter 104. After it is cut, it is moved through a conveyor in feeder house 106 toward feed accelerator 108, which accelerates the crop into thresher 110. The crop is threshed by rotor 112 rotating the crop against concave 114. The threshed crop is moved by a separator rotor in separator 116 where some of the residue is moved by discharge beater 126 toward the residue subsystem 138. It can be chopped by residue chopper 140 and spread on the field by spreader 142. In other implementations, the residue is simply dropped in a windrow, instead of being chopped and spread.

Grain falls to cleaning shoe (or cleaning subsystem) 118. Chaffer 122 separates some of the larger material from the grain, and sieve 124 separates some of the finer material from the clean grain. Clean grain falls to an auger in clean grain elevator 130, which moves the clean grain upward and deposits it in clean grain tank 132. Residue can be removed from the cleaning shoe 118 by airflow generated by cleaning fan 120. That residue can also be moved rearwardly in combine 100 toward the residue handling subsystem 138.

Tailings can be moved by tailings elevator 128 back to thresher 110 where they can be re-threshed. Alternatively, the tailings can also be passed to a separate re-threshing mechanism (also using a tailings elevator or another transport mechanism) where they can be re-threshed as well.

FIG. 1 also shows that, in one example, combine 100 can include ground speed sensor 147, one or more separator loss sensors 148, a clean grain camera 150, and one or more cleaning shoe loss sensors 152. Ground speed sensor 146 illustratively senses the travel speed of combine 100 over the ground. This can be done by sensing the speed of rotation of the wheels, the drive shaft, the axel, or other components. The travel speed can also be sensed by a positioning system, such as a global positioning system (GPS), a dead reckoning system, a LORAN system, or a wide variety of other systems or sensors that provide an indication of travel speed.

Cleaning shoe loss sensors 152 illustratively provide an output signal indicative of the quantity of grain loss by both the right and left sides of the cleaning shoe 118. In one example, sensors 152 are strike sensors which count grain strikes per unit of time (or per unit of distance traveled) to provide an indication of the cleaning shoe grain loss. The strike sensors for the right and left sides of the cleaning shoe can provide individual signals, or a combined or aggregated signal. It will be noted that sensors 152 can comprise only a single sensor as well, instead of separate sensors for each shoe.

Separator loss sensor 148 provides a signal indicative of grain loss in the left and right separators. The sensors associated with the left and right separators can provide separate grain loss signals or a combined or aggregate signal. This can be done using a wide variety of different types of sensors as well. It will be noted that separator loss sensors 148 may also comprise only a single sensor, instead of separate left and right sensors.

It will also be appreciated that sensor and measurement mechanisms (in addition to the sensors already described) can include other sensors on combine 100 as well. For instance, they can include a residue setting sensor that is configured to sense whether machine 100 is configured to chop the residue, drop a windrow, etc. They can include cleaning shoe fan speed sensors that can be configured proximate fan 120 to sense the speed of the fan. They can include a threshing clearance sensor that senses clearance between the rotor 112 and concaves 114. They include a threshing rotor speed sensor that senses a rotor speed of rotor 112. They can include a chaffer clearance sensor that senses the size of openings in chaffer 122. They can include a sieve clearance sensor that senses the size of openings in sieve 124. They can include a material other than grain (MOG)

moisture sensor that can be configured to sense the moisture level of the material other than grain that is passing through combine 100. They can include machine setting sensors that are configured to sense the various configurable settings on combine 100. They can also include a machine orientation sensor that can be any of a wide variety of different types of sensors that sense the orientation of combine 100. Crop property sensors can sense a variety of different types of crop properties, such as crop type, crop moisture, and other crop properties. They can also be configured to sense characteristics of the crop as they are being processed by combine 100. For instance, they can sense grain feed rate, as it travels through clean grain elevator 130. They can sense mass flow rate of grain through elevator 130, or provide other output signals indicative of other sensed variables. Some additional examples of the types of sensors that can be used are described below.

Figure 2:
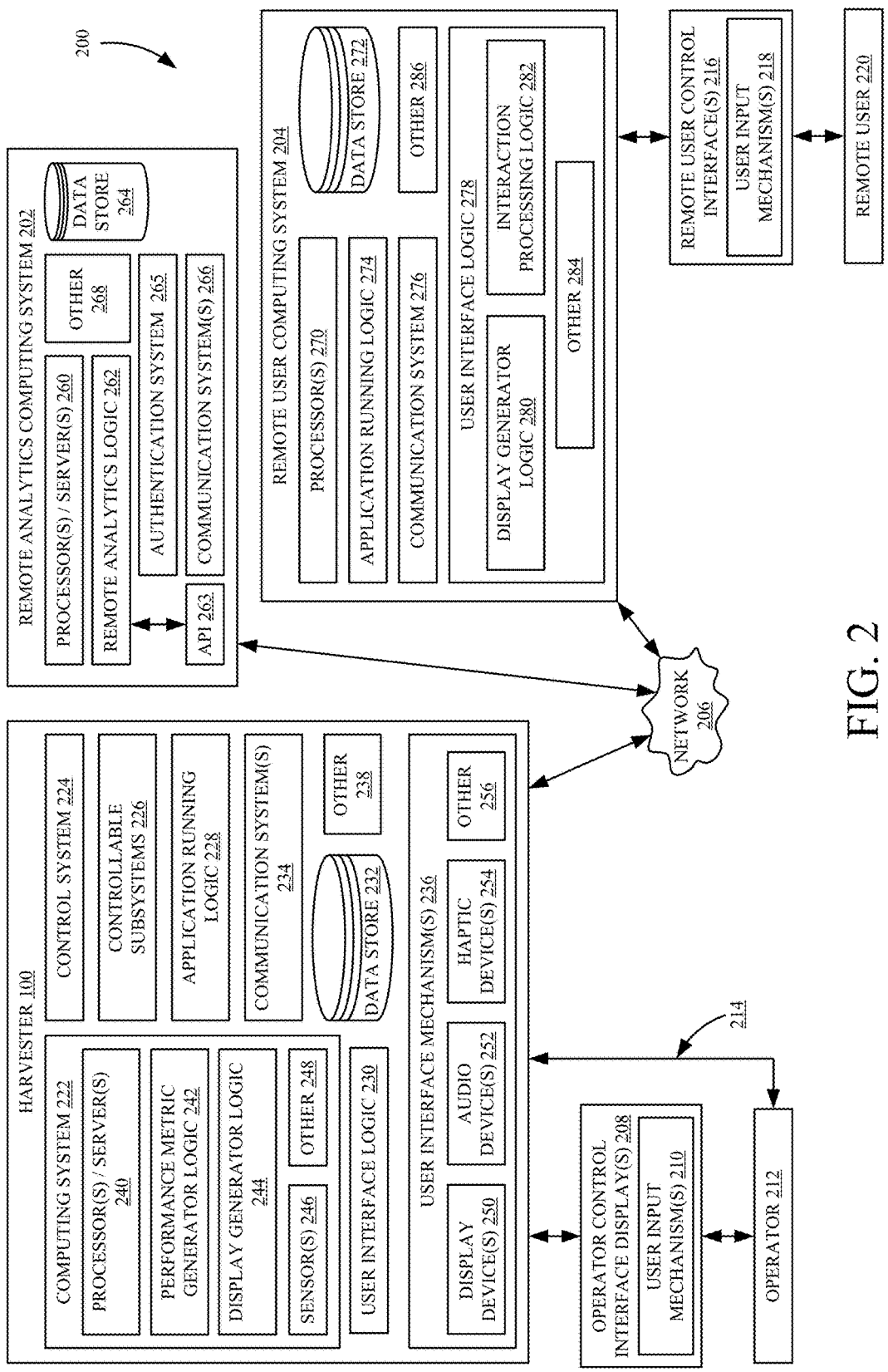
FIG. 2 is a block diagram of one example of a computing system architecture that includes the combine harvester illustrated in FIG. 1.

FIG. 2 is a block diagram showing one example of an architecture 200 that includes combine harvester 100 coupled for communication with remote analytics computing system 202 and remote manager computing 204, over network 206. Network 206 can be any of a wide variety of different types of networks, such as a wide area network, a local area network, a near field communication network, a cellular network, or any of a wide variety of other networks or combinations of networks. As is discussed in greater detail below, combine harvester 100 can communicate with other systems using store-and-forward mechanisms as well. FIG. 2 also shows that, in one example, combine harvester 100 can generate operator interface displays 208 with user input mechanisms 210 for interaction by operator 212. Operator 212 is illustratively a local operator of combine 100, in the operator's compartment of combine 100, and can interact with user input mechanisms 210 in order to control and manipulate combine harvester 100. In addition, as is described below, operator 212 can interact directly with other user interface mechanisms on combine harvester 100. This is indicated by arrow 214.

FIG. 2 also shows that, in one example, remote manager computing system 204 illustratively generates user interfaces 216, with user input mechanisms 218, for interaction by remote user 220 (who may be a farm manager, a remote manager, or other remote user that has access to data corresponding to combine 100). Remote user 220 illustratively interacts with user input mechanisms 218 in order to control and manipulate remote manager computing system 204, and, in some examples, to control portions of combine harvester 100 and/or remote analytics computing system 202.

Before describing the overall operation of architecture 200 in more detail, a brief description of some of the items in architecture 200, and their operation, will first be provided. As shown in FIG. 2, in addition to the items described above with respect to FIG. 1, combine 100 can include computing system 222, one or more control systems 224, controllable subsystems 226, application running logic 228, user interface logic 230, data store 232, one or more communication systems 234, user interface mechanisms 236, and it can include a wide variety of other items 238. Computing system 222, itself, can include one or more processors or servers 240, performance metric generator logic 242, display generator logic 244, a plurality of different sensors 246, and it can include a wide variety of other items 248. User interface mechanisms 236 can include one or more display devices 250, one or more audio devices 252, one or more haptic devices 254, and it can include other items 256, such as a steering wheel, joysticks, pedals, levers, buttons, keypads, etc.

As described above with respect to FIG. 1, sensors 246 can generate a wide variety of different sensor signals representing a wide variety of different sensed variables. Performance metric generator logic 242 (as is described in greater detail below with respect to FIG. 3) illustratively generates performance metrics indicative of the operational performance of combine 100. Display generator logic 244 illustratively generates a control interface display for operator 212. The display can be an interactive display with user input mechanisms 210 for interaction by operator 212.

Control system 224 can generate control signals for controlling a variety of different controllable subsystems 226 based on the sensor signals generated by sensors 246, based on the performance metrics generated by performance score generator logic 244, based upon user inputs received through user interface mechanisms 236, based upon information received from remote manager computing system 204 or from remote analytics computing system 202, or it can generate control signals a wide variety of other ways as well. Controllable subsystems 226 can include a variety of different systems, such as a propulsion system used to drive combine 100, a threshing subsystem as described above with respect to FIG. 1, a cleaning subsystem (such as the cleaning fan, the chaffer, the sieve, etc.) and/or a variety of other controllable subsystems, some of which are discussed above with respect to FIG. 1.

Application running logic 228 can illustratively run any of a variety of different applications that may be stored in data store 232. The applications can be used to control combine 100, to aggregate information sensed and collected by combine 100, to communicate that information to other systems, etc. Communication systems 234 illustratively include one or more communication systems that allow combine 100 to communicate with remote analytics computing system 202 and remote manager computing system 204. Thus, they include one or more communication systems, that can communicate over the networks described above.

Display generator logic 244 illustratively generates an operator display and uses user interface logic 230 to display the operator display on one of display devices 250. It will be noted that display devices 250 can include a display device that is integrated into the operator compartment of combine 100, or it can be a separate display on a separate device that may be carried by operator 212 (such as a laptop computer, a mobile device, etc.). All of these architectures are contemplated herein.

In the example shown in FIG. 2, remote analytics computing system 202 illustratively includes one or more processors or servers 260, remote analytics logic 262 which exposes an application programming interface (API) 263, data store 264, authentication system 265, one or more communication systems 266 and it can include a wide variety of other items 268. Remote analytics logic 262 illustratively receives the performance metrics generated by performance metric generator logic 242 in computing system 222, from a plurality of different combines, including combine 100. It can illustratively aggregate that data and compare it to reference sets of data to generate multi-machine performance metrics that are based on the performance information from a plurality of different machines. The data can be stored on data store 202, along with a wide variety of other information, such as operator information corresponding to the operators of each of the combines, machine details identifying the particular machines being used, the current machine settings for each machine that are updated by the machines, and historical data collected from the various machines. The data store 202 can include authentication information used to authenticate remote user 220, operator 212, and others. It can include mappings between combines and the remote users they are assigned to. It can include a wide variety of other information as well.

Remote analytics computing system 202 illustratively uses one or more of the communication systems 266 to communicate with both combine 100 (and other combines) and remote manager computing system 204.

Remote manager computing system 204 can be a wide variety of different types of systems, such as a mobile device, a laptop computer, etc. It illustratively includes one or more processors 270, data store 272, application running logic 274, communication system 276, and user interface logic 278 (which, itself, includes display generator logic 280, interaction processing logic 282, and it can include other items 284). Remote manager computing system 204 can, also include a wide variety of other items 286.

Application running logic 274 illustratively runs an application that allows remote user 220 to access comparison information that compares the performance of various combines 100 and their operators on a near real time basis (such as within five seconds of real time or within another time value of real time). It also illustratively surfaces user control interfaces 216, with user input mechanisms 218 so that remote user 220 can provide settings inputs, or other control information, and communicate it to one or more combines 100. Again, as with communication systems 234 and 266, communication system 276 allows remote manager computing system 204 to communicate with other systems over network 206. Display generator logic 282 illustratively generates a display, with various interactive display elements on control user interface 216. Interaction processing logic 282 illustratively detects user interaction with the display, from remote user 220, and performs control operations based upon those user interactions.

Figure 3:
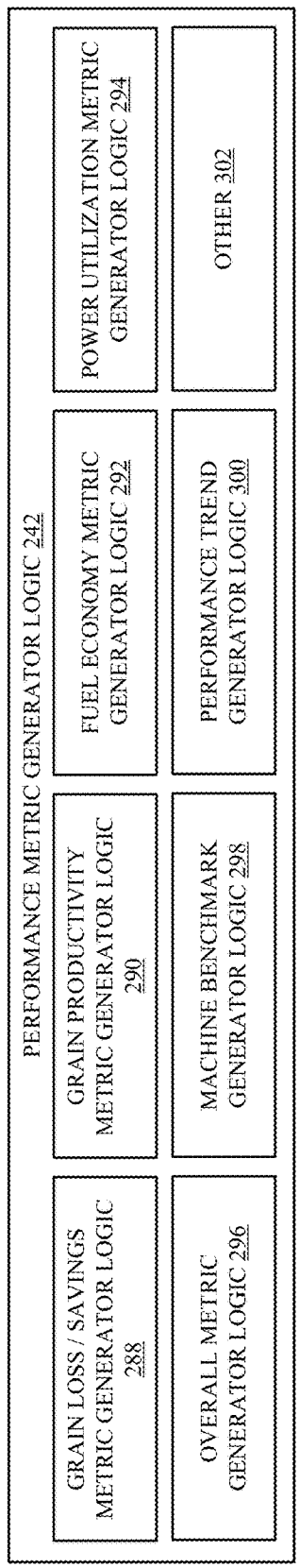
FIG. 3 is a block diagram showing one example of performance metric generator logic in more detail.

FIG. 3 is a block diagram showing one example of performance metric generator logic 242, in more detail. In the example shown in FIG. 3, performance metric generator logic 242 illustratively includes grain loss/savings metric generator logic 288, grain productivity metric generator logic 290, fuel economy metric generator logic 292, power utilization metric generator logic 294, overall metric generator logic 296, machine benchmark generator logic 298, performance trend generator logic 300, and it can include a wide variety of other items 302. Some ways of generating performance metrics are shown in more detail in co-pending US Patent Publication numbers 2015/0199637 A1, 2015/0199360 A1, 2015/0199630 A1, 2015/0199775 A1, 2016/0078391 A1 which are incorporated herein by reference.

Grain loss/savings metric generator logic 288 illustratively generates a metric indicative of grain savings or grain loss that the combine 100 is experiencing. This can be generated by sensing and combining items such as the mass flow of crop through combine 100 sensed by a sensor 246, tailings volume of tailings output by combine 100 using a volume sensor, crop type, the measured loss on combine 100 using various loss sensors (such as separator loss sensors, cleaning shoe loss sensors, etc.), among others. The metric can be generated by performing an evaluation of the loss using fuzzy logic components and an evaluation of the tailings, also using fuzzy logic components. Based upon these and/or other considerations, grain loss/savings metric generator logic 288 illustratively generates a grain loss/savings metric indicative of the performance of combine 100, under the operation of operator 212, with respect to grain loss/savings.

Grain productivity metric generator logic 290 illustratively uses the sensor signals generated by sensors 246 on the combine to sense vehicle speed, mass flow of grain through combine 100, and the machine configuration of combine 100 and generates an indication of crop yield and processes the crop yield to evaluate it against a productivity metric. For instance, a productivity metric plotted against a yield slope provides an output indicative of grain productivity. This is only one example.

Fuel economy metric generator logic 292 illustratively generates a fuel economy metric, based upon the throughput versus fuel consumption rate sensed by sensors on the combine 100, a separator efficiency metric and also, based upon sensed fuel consumption that is sensed by a sensor 246, vehicle state, vehicle speed, etc. The fuel economy metric can be based on a combination of a harvest fuel efficiency and a non-productive fuel efficiency. These metrics may indicate, respectively, the efficiency of combine 100 during harvesting operations, and in other, non-harvesting operations (such as when idling, etc.). Again, fuzzy logic components are illustratively applied to generate a metric indicative of fuel economy, although this is only one example.

Power utilization generator logic 294 illustratively generates a power utilization metric based on sensor signals from sensors 246 (or based on derived engine power used by combine 100, that is derived from sensor signals) under the control of operator 212. The sensors may generate sensor signals indicative of engine usage, engine load, engine speed, etc. The power utilization metric may indicate whether the machine could be more efficiently run at higher or lower power levels, etc.

Overall metric generator logic 296 illustratively generates a metric that is based upon a combination of the various metrics output by logic 288-294. It illustratively provides a metric indicative of the overall operational performance of combine 100, under the operation of operator 212.

Machine benchmark generator logic 298 illustratively generates a machine benchmark metric for each of the metrics generated by items of logic 288-296. The machine benchmark metric can, for instance, reflect the operation of combine 100, under the control of operator 212, for each of the particular metrics, over a previous time period. For instance, the machine benchmark metric for grain loss/savings may be an average of the value of the grain loss/savings metric generated by logic 288 over the prior 10 hours (or over another time period). In one example, machine benchmark generator logic 298 generates such a benchmark metric for each of the categories or metrics generated by items of logic 288-296.

Performance trend generator logic 300 illustratively generates a metric indicative of the performance of machine 100, under the operation of operator 212, over a shorter period of time than is considered by machine benchmark generator logic 298. For instance, performance trend generator logic 300 illustratively generates a trend metric indicating how combine 100 has performed over the previous 30 minutes, in each of the performance categories addressed by items of logic 288-296. In one example, it saves periodically-generated values so that it can generate a trace or continuous depiction of the value of that particular metric over the previous 30 minutes (or other time period). This is described in more detail below with respect to FIGS. 7A and 12.

Figure 4:
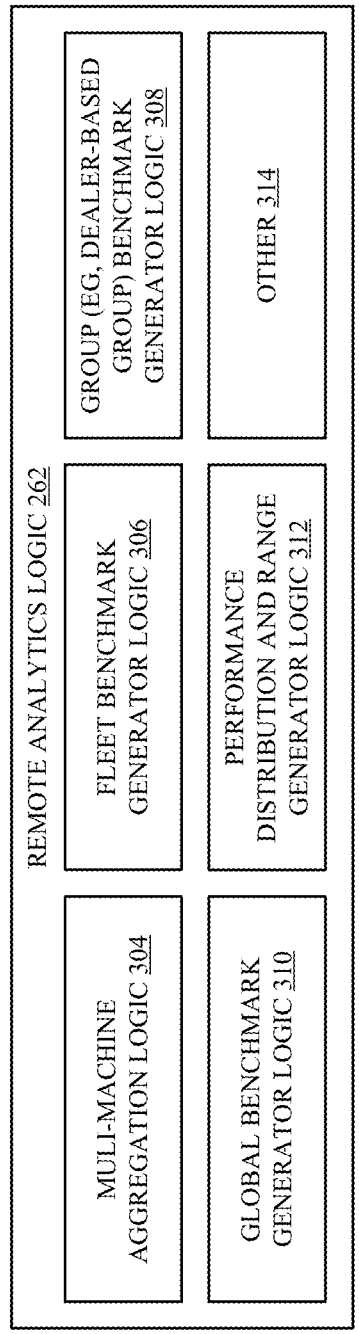
FIG. 4 is a block diagram showing one example of a remote analytics logic in more detail.

FIG. 4 is a block diagram showing one example of remote analytics logic 262 in more detail. FIG. 4 shows that, in one example, remote analytics logic 262 includes multi-machine aggregation logic 304, fleet benchmark generator logic 306, group (e.g., location-based group or other group) benchmark generator logic 308, global benchmark generator logic 310, performance distribution and range generator logic 312, and it can include a wide variety of other items 314. Multi-machine aggregation logic 304 illustratively aggregates performance information received from a plurality of different combines (including combine 100) and aggregates that information so that it can be stored or retrieved for comparison or other processing. Fleet benchmark generator logic 306 illustratively generates a fleet benchmark metric based upon the multi-machine information aggregated by logic 304. The fleet benchmark metric is illustratively indicative of the performance of a fleet of combines 100 corresponding to a particular organization that are currently harvesting the same crop as combine 100, over the last 10 hours (or other time period). Thus, in one example, fleet benchmark generator logic 306 illustratively generates an average metric indicating the average performance metric, in each of the performance categories discussed above with respect to FIG. 3, for all combines currently operating in the fleet. The average may be calculated based upon the particular performance metric values aggregated for all such combines over the last 10 hours.

Group (e.g., location-based group or other group) benchmark generator logic 308 illustratively generates a similar benchmark metric, except that the number of combines that the metric is generated over is larger than that used by fleet benchmark generator logic 306. Instead, combines from which data is obtained to generate the group benchmark metric may include data from multiple fleets or other groups.

Global benchmark generator logic 310 generates a similar set of metrics (one for each of the performance categories discussed above with respect to FIG. 3), except that the number of combines from which data is obtained to generate the metric is larger than that used by group benchmark generator logic 308. For instance, in one example, global benchmark generator logic 310 may generate a performance metric based upon the performance data obtained from all combines (which are accessible by remote analytics computing system 202) that are harvesting globally in a particular crop. The metric may be generated based on the data aggregated from those combines over the past 10 hours (or other time period).

Performance distribution and range generator logic 312 illustratively identifies a statistical distribution of observed performance values for combines 100. The statistical distribution may be generated in terms of a bell curve so that the performance values are divided into ranges corresponding to a high performance operating range, an average performance operating range and a low performance operating range. These are examples only.

Figure 5:
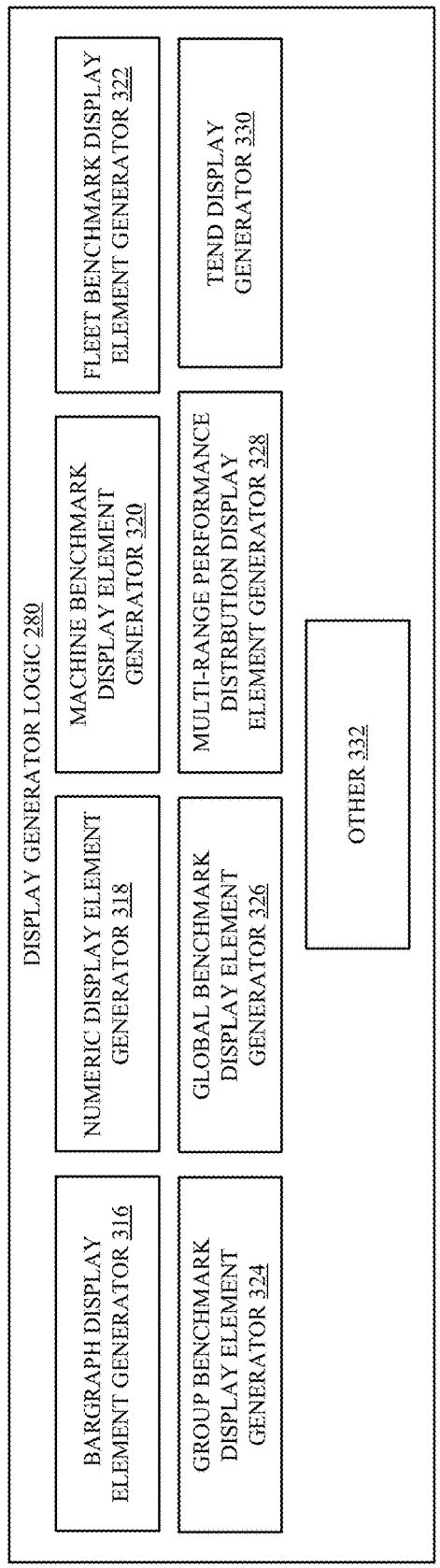
FIG. 5 is a block diagram showing one example of display generator logic in more detail.

FIG. 5 is a block diagram showing one example of display generator logic 280 on remote manager computing system 204 in more detail. In the example illustrated in FIG. 5, display generator logic 280 illustratively includes bar graph display element generator 316, numeric display element generator 318, machine benchmark display element generator 320, fleet benchmark display element generator 322, group benchmark display element generator 324, global benchmark display element generator 326, multi-range performance distribution display element generator 328, trend display generator 330, display device controller 331, and it can include a wide variety of other items 332. Each of the generators 316-330 generate a display element corresponding to the various performance metrics described above with respect to FIGS. 3 and 4. Therefore, generator 316 illustratively generates a bar graph display element corresponding to each of the metrics described above. It illustratively generates a bar graph display element corresponding to each of the performance metrics indicative of grain loss/savings, grain productivity, fuel efficiency, power utilization, and the overall metric described above with respect to FIG. 3. Generator 318 illustratively generates a numeric display corresponding to the bar graphs generated by generator 316, and also corresponding to the fleet benchmark metric generated by fleet benchmark generator 306. Machine benchmark display element generator 320 illustratively generates a display element corresponding to the machine benchmarks generated by machine generator logic 298. Fleet benchmark display element generator 322 generates a display element corresponding to the fleet benchmarks generated by fleet benchmark generator logic 306. Group benchmark display element generator 324 and global benchmark display element generator 326 generate display elements corresponding to each of the group benchmark metrics and global benchmark metrics described above with respect to logic 308 and 310 in FIG. 4, and multi-range performance distribution display element generator 328 generates a display element corresponding to the performance distribution and ranges generated by logic 312 in FIG. 4. Trend display generator 330 illustratively generates display elements indicative of the trends identified by performance trend generator logic 300. Display device controller 331 controls the display device on which the display is generated to place elements, relative to one another, as described in more detail below.

Figure 6:
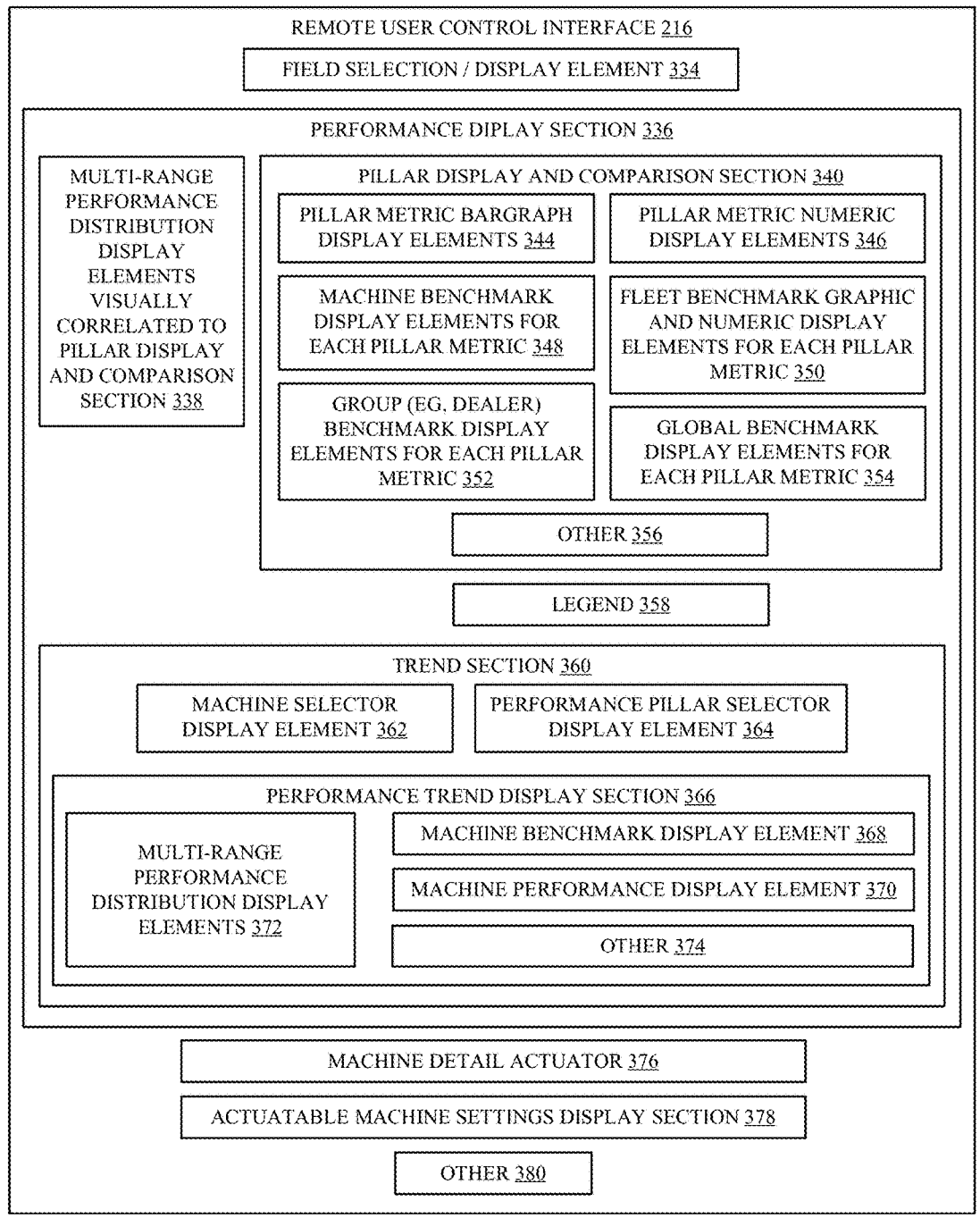
FIG. 6 is a block diagram showing one example of a remote user control interface.

FIG. 6 is a block diagram showing one example of a remote manager (or remote user) control interface 216. Interface 216 illustratively includes field selection and display element 334. Element 334 illustratively includes a user actuatable element that allows user 220 to select a particular field being harvested so that user 220 can see and compare the operation of the various combines 100 harvesting in the selected field. Element 334 can also include a description or identifier corresponding to the selected field.

Performance display section 336 illustratively displays the display elements discussed above, that identify the performance of various machines, with respect to different performance categories or performance criteria, so that they can be compared relative to one another. Thus, the user control interface 216 illustratively includes multi-range performance distribution display elements 338 that are visually correlated to a pillar display and comparison section 340. A number of examples of this are described below with respect to FIGS. 7A-7D.

Pillar display and comparison section 340 illustratively includes multi-machine pillar metric display and comparison section 342 that displays the various pillar metrics (also referred to as performance metrics) for the plurality of combines so that they can be compared relative to one another. It can include bar graph display elements 344, numeric display elements 346, machine benchmark display elements 348 for each pillar metric, fleet benchmark graphic and numeric display elements 350 for each pillar metric, group (e.g., dealer) benchmark display elements 352 for each pillar metric, global benchmark display elements 354 for each pillar metric, and it can include other items 356. Pillar display and comparison section 340 also illustratively includes legend 358.

The performance display section 336 can also include trend section 360 which includes a user actuatable machine selector display element 362, a user actuatable performance pillar selector display element 364, and performance trend display section 366. User 220 illustratively actuates machine selector display element 362 in order to select one of the multiple combines that the user 220 has access to, for display. User 220 illustratively actuates performance pillar selector display element 364 to select a particular performance pillar or performance metric for which user 220 wishes to see a trend, corresponding to the selected combine. Performance trend display section 336 then illustratively displays trend information for the selected combine that includes machine benchmark display element 368, machine performance display element 370, and multi-range distribution display element 372. Element 368 illustratively displays the machine benchmark display element, for the machine selected by selector 362, and for the particular performance pillar (or performance criteria) selected by selector 364. Machine performance display element 370 illustratively displays the value of the performance pillar selected by display element 364, to show how it has varied over a predetermined period of time (such as the prior 30 minutes, 60 minutes, etc.). Both display elements 368 and 370 are plotted relative to display element 372 so user 220 can quickly see how they compare to the performance distribution represented by display elements 372. Performance trend display element 366 can include other items as well. This is indicated by block 374.

In one example, remote user control interface 216 illustratively includes machine detail actuator 376, actuatable machine setting display section 378, and it can include other items 380. Machine detail actuator 376 can illustratively be actuated by user 220. This controls communication system 276 to communicate with combine 100 (the selected combine) and/or system 202 to retrieve information from the combine 100 and/or system 202. The retrieval information, which can be displayed can include machine details, such as the identifying information corresponding to the machine, the operator information corresponding to the operator that is currently operating the machine, the service record of the machine, the machine settings, near real time sensor signal values being generated by sensors 246 on the selected machine, etc. The communication is illustratively provided over a secure link after authenticating remote user 220.

Machine settings display section 378 illustratively displays the current settings of the selected machine. For instance, it may display the fan speed settings, the rotor speed settings, the sieve and chaffer clearance settings, the thresher clearance settings, among other settings. In one example, when user 220 actuates the actuatable machine settings display element 378, user 220 is navigated through a user experience that allows the user to request or recommend adjustments to the displayed settings. This is described in greater detail below.

Figure 7A:
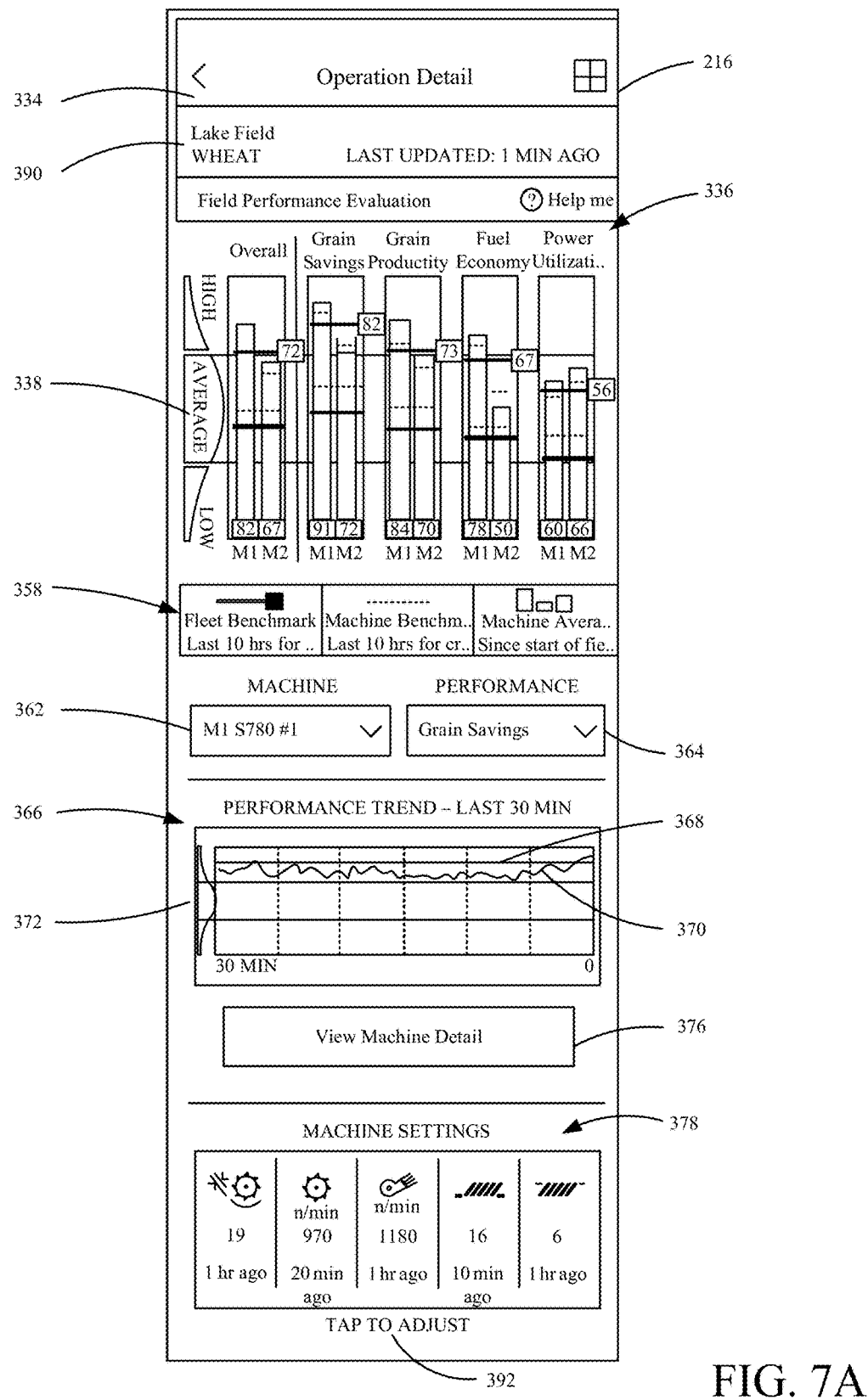
FIGS. 7A-7D show various examples of a remote user control interface.
Figure 7B:
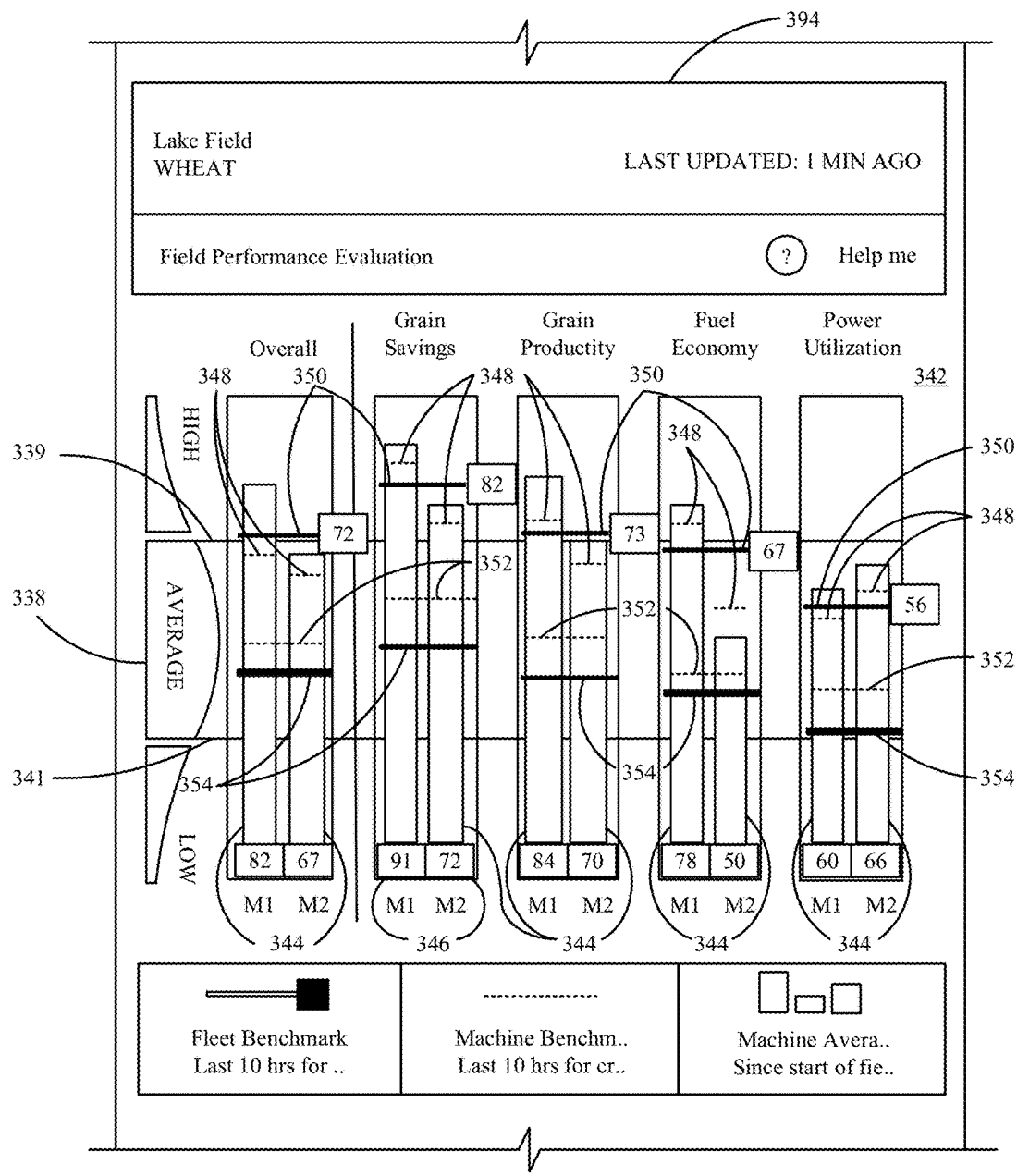

FIG. 7A shows one example of a more detailed view of remote manager user interface 216, shown in block diagram form in FIG. 6. Some of the items illustrated in FIG. 6, are shown in more detail in FIG. 7A. FIG. 7B is an enlarged view of a portion of FIG. 7A, and it is enlarged for the sake of clarity. FIGS. 7A and 7B will now be described in conjunction with one another. Similar items to those shown in FIG. 6 are similarly numbered in FIGS. 7A and 7B.

It can be seen in FIGS. 7A and 7B that the fleet selector/display element 334 includes a written description 390 of the field that has been selected, and the crop planted in the field. It can also be seen that pillar display and comparison section 340 illustratively displays bar graphs, for each performance metric, for two different combines. While a similar display can be generated for a single machine, and that is expressly contemplated herein, the present description proceeds with respect to displaying data for multiple machines. The bar graphs for the two different combines are displayed adjacent one another, so that each performance metric can be compared, in a relatively straight forward way, between the two combines. The bar graph for the first combine is designated M1 while the bar graph for the second combine is designated M2. In addition, numeric display elements 346 are shown toward the bottom of each bar graph so that the remote operator 220 need not translate the meaning of the bar graph, but may instead identify a particular numeric value corresponding to each performance pillar (or performance metric) for each machine (or combine).

In one example, the bar graphs 344 can be color-coded. For instance, they may be color coded based on the score level. There may be multiple different colors to code different score levels. In another example, if the machine is operating above a particular threshold value (such as the machine benchmark, the fleet benchmark, etc.), then the bar graph may be colored a first color. However, if the machine is operating below the threshold value, then the bar graph may be colored a second color. It can also be seen in FIGS. 7A and 7B that the fleet benchmark graphic element 350 is represented by both a line and a numeric value. Display device controller 331 controls the display device so they are placed on the bar graph at a position that corresponds to the numeric value, assuming that the bar graph corresponds to the numeric value 346 assigned to it. Thus, as shown in FIGS. 7A and 7B, the bar graphs showing the overall performance metric for machine 1 and machine 2 have numeric values of 82 and 67, respectively. Therefore, display device controller 331 places the fleet benchmark display element 350, which corresponds to a numeric value of 72, above the top of the bar graph for machine M2 but below the top of the bar graph for machine M1.

The machine benchmark display elements are represented by dashed lines segments shown at 348. They are also placed on the bar graph corresponding to the machine that has that benchmark value. The group benchmark display elements and global benchmark display elements are also shown by horizontal line segments (dashed and solid, respectively), which may be colored differently or have a thickness different than the other benchmarks. All of the values are illustratively visually distinguishable from one another.

FIGS. 7A and 7B also show that display device controller 331 controls the display device to place the performance distribution display elements 338 along the left side of the multi-machine pillar display and comparison section 340. They are shown in the form of a bell curve which represents high, average, and low performance, respectively. It can be seen that the remainder of display portion 342 is shaded with shading indicated by lines 339 and 341 that are projected over from the bell curve portion of display element 338, across the bar graphs, to distinguish the high, average and low performance ranges on the performance distribution, from the other ranges. Therefore, the performance distribution is projected across all of the bar graphs (with the shading) so that it can easily be seen whether the machines are performing in the high, average, or low performance ranges.

In the example shown in FIG. 7A, machine selector display element 362 and performance pillar selector display element 364 are both shown as drop-down menu actuators that can be actuated by the remote user 220 to control the application to select a particular machine and a particular performance pillar. When one of the machines is selected, a machine identifier (such as a textual identifier) corresponding to that machine is displayed on actuator 362. When one of the performance pillars is selected, an identifier (such as a textual description) of that pillar is displayed on actuator 364.

FIG. 7A also shows that, in one example, the performance trend display section 366 displays a performance distribution display element 372 and a continuous machine benchmark display element 368, along with a continuous machine performance display element 370. Display elements 368 and 370 reflect the value of the performance pillar selected by actuator 364 for an immediately prior time period. In the example shown in FIG. 7A, the machine benchmark value and the performance value corresponding to the selected performance pillar over the previous 30 minutes. The performance distribution display element 372 can also have a shaded portion that extends across the performance trend display section 366 so it can easily be determined whether the machine benchmark or the machine performance value falls in the high, average or low performance distribution ranges.

FIG. 7A also shows that the machine detail actuator 376 is displayed as an actuatable button, that can be actuated by user 220. In response to detected user actuation of actuator 376, a pop-up display, or another type of display, can be generated that shows the details of the machine being reviewed. As mentioned above, the displayed details can include machine and operator identifying information, live (or near real time) sensor signal values, current machine settings, trend data, etc.

Machine settings display section 378, in the example shown in FIG. 7A, shows display elements that reflect the value of current machine settings. These can be obtained by controlling communication system 276 to retrieve them from system 202 or from combine 100, directly. They can include the threshing clearance, the threshing rotor speed, the cleaning fan speed, the chaffer clearance, and the sieve clearance. In addition, there may be settings that are made by the operator outside the operator's compartment. These settings may be sensed. If they are not sensed, they can be input by the operator. These are examples only.

In one example, an adjustment actuator 392 is also provided. When the user 220 actuates the adjustment actuator 392, the application navigates the user to a display and user experience that allows the user to adjust the values of the displayed settings, and communicate those adjusted values to combine 100 and the operator 212 of the combine 100.

Figure 7C:
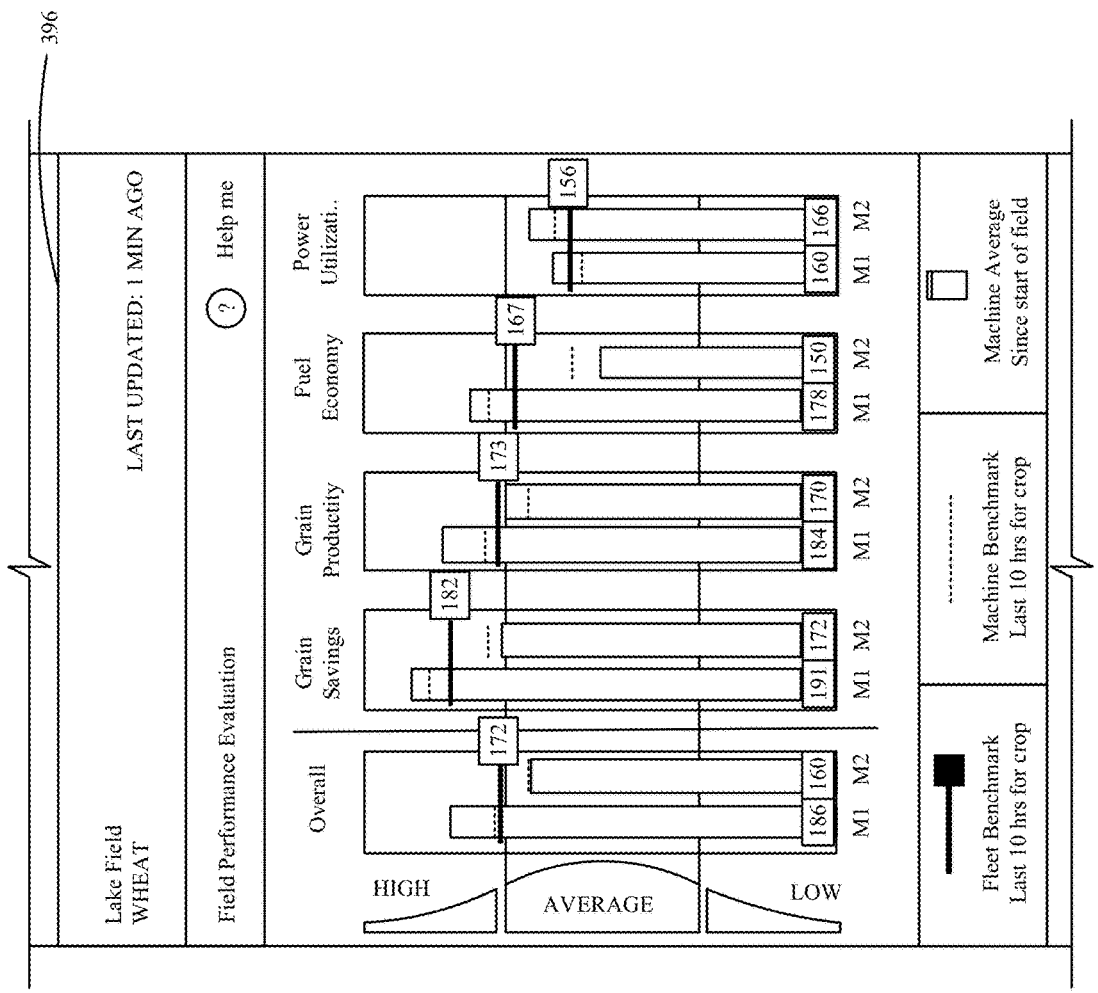

FIG. 7C shows user interface display 396, that is similar to user interface display 216 shown in FIGS. 7A and 7B. However, the user interface display 396 has a different scale. In FIG. 7B, the bar graphs are scaled from 0-100, while in FIG. 7C, the bar graphs are scaled from 0-200.

Figure 7D:
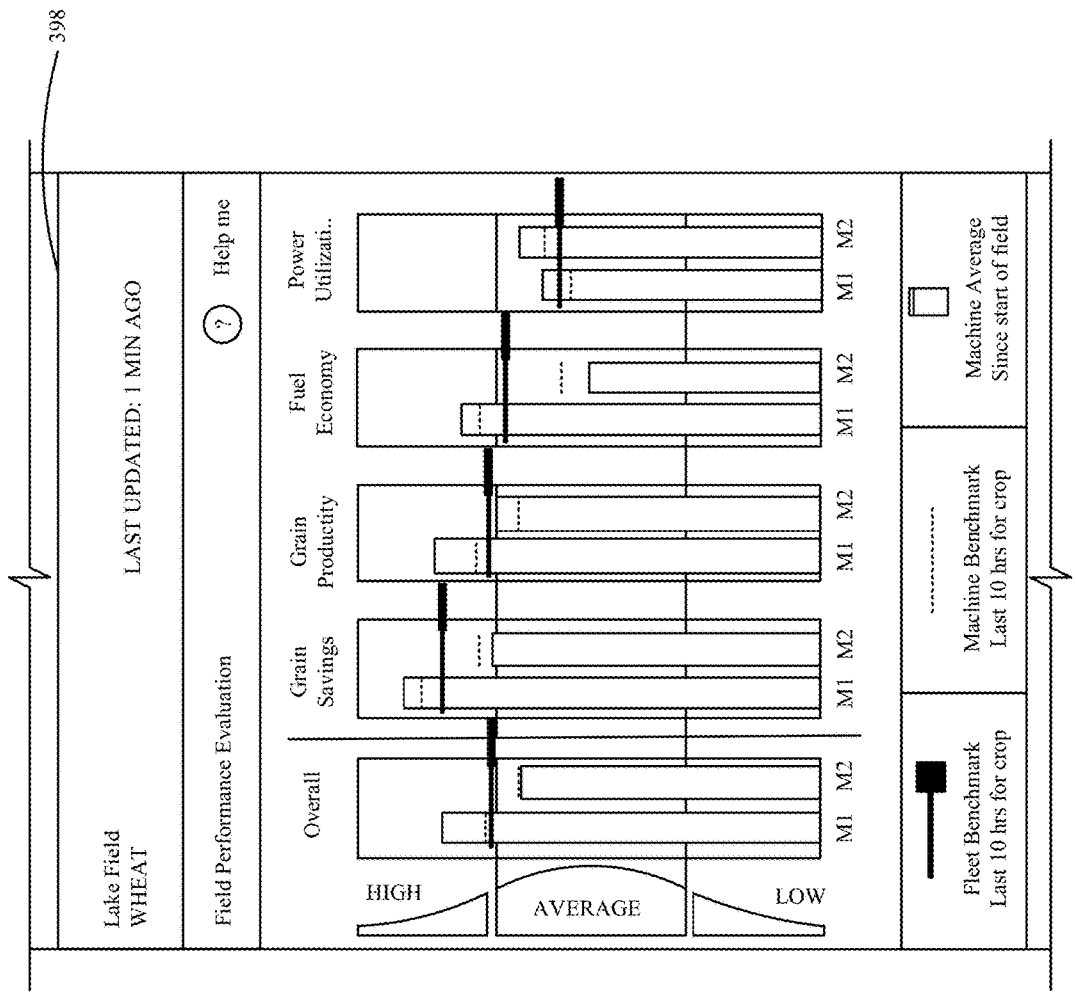

FIG. 7D shows another user interface display 398, which is similar to that shown in FIGS. 7B and 7C. However, in FIG. 7D, the numerical indicators for the performance pillars (and corresponding to the bar graphs) and those corresponding to the fleet benchmark values are removed. Thus, FIG. 7D provides a relative comparison of the two machines, as compared to one another, as compared to the fleet benchmark value, the machine benchmark value, the machine average value, the group benchmark value, the global benchmark value, and the performance distribution. However, unlike the other figures, no numeric values are provided.

It will be appreciated that all of the examples shown in FIGS. 7A-7D are contemplated herein, along with others. For instance, it may be that the bar graphs are neither color-coded, nor coded with shading. That is, the color or shading of the bar graphs need not change based on whether the value of the bar graph meets or fails to meet a threshold value. Similarly, the numerical indicators need not be provided for the values reflected on the user interface display. In addition, the fleet benchmark, machine benchmark, global benchmark, and/or group benchmark need not be displayed. However, in one example, the user interface display displays multiple machines with display elements corresponding to each performance pillar, so the performance of the multiple machines can be compared to one another, within each performance metric or performance pillar, relatively easily. In addition, in one example, the fleet benchmark reference value is indicated by a fleet reference display element, and the performance distribution is also indicated using the bell curve display element. It will be appreciated that all of the additional display elements discussed above can be provided as well.

Figure 8:
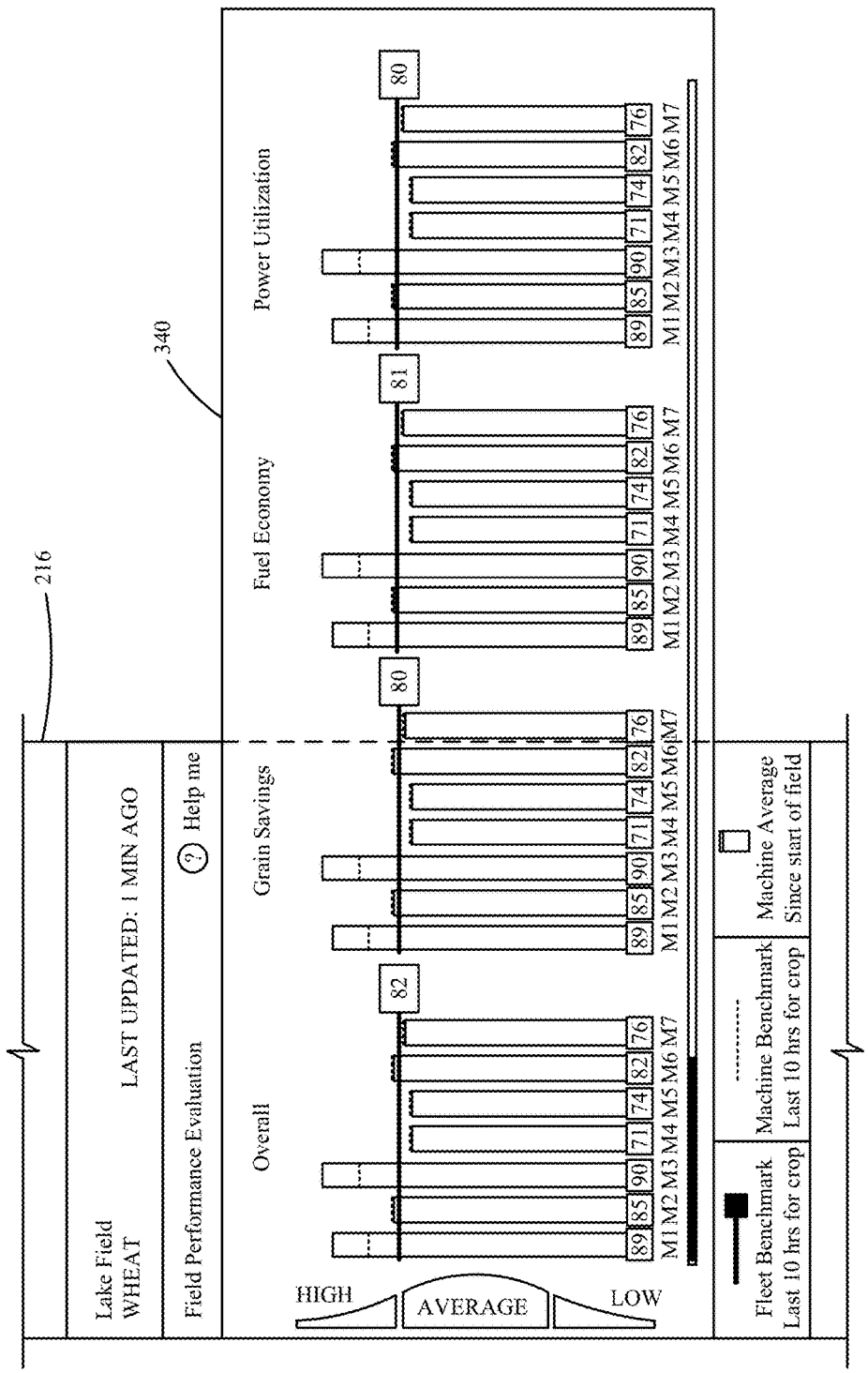
FIG. 8 shows another example of a remote user control interface.
Figure 9:
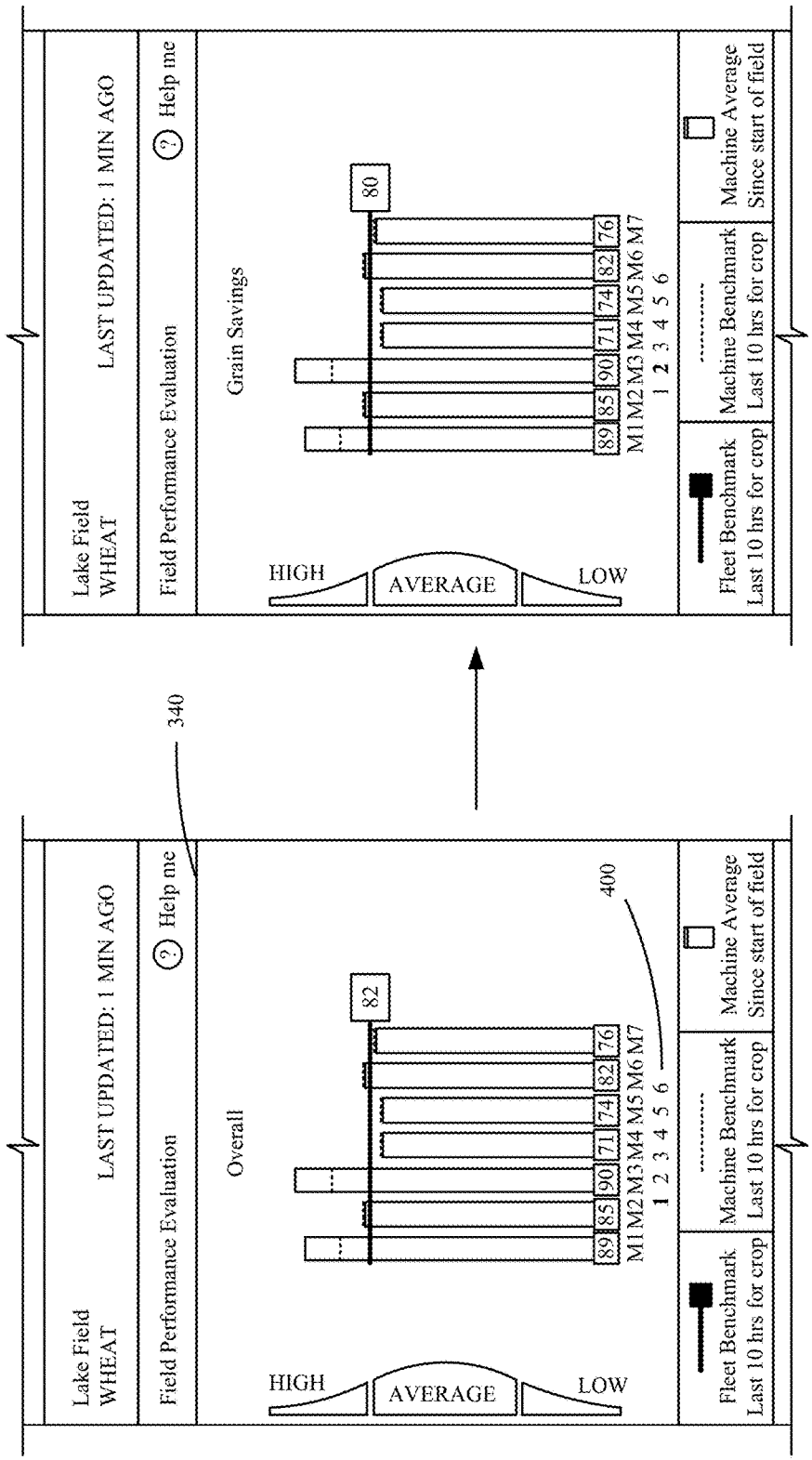
FIG. 9 shows another example of a remote user control interface.

FIGS. 8 and 9 show additional examples of a remote manager user interface display 216. In FIG. 8, it can be seen that some of the items in the display are similar to those shown in FIGS. 7A and 7B. However, in FIG. 8, the display is not only comparing the performance of two machines, but is instead comparing the performance of seven machines. Thus, the bar graph display elements, and the various other display elements are all generated for the seven different machines. Because there are now a larger number of bar graphs being displayed, FIG. 8 shows that the pillar display and comparison section 340 is horizontally pannable (or horizontally scrollable). Therefore, with a touch gesture (such as a swipe gesture) or other appropriate user input, the remote manager 220 can pan or scroll section 340 horizontally to view other performance pillars for the seven different machines.

FIG. 9 is similar to FIG. 8, except that the scrolling actuator is now represented by a series of selector elements 400. When the user taps one of the selector elements, section 340 displays the bar graphs corresponding to a different performance pillar. Thus, instead of a continuous horizontally scrolling or panning pane, as illustrated in FIG. 8, the display section 340 is displayed with discrete, selectable display portions corresponding to different performance metrics.

Figure 10:
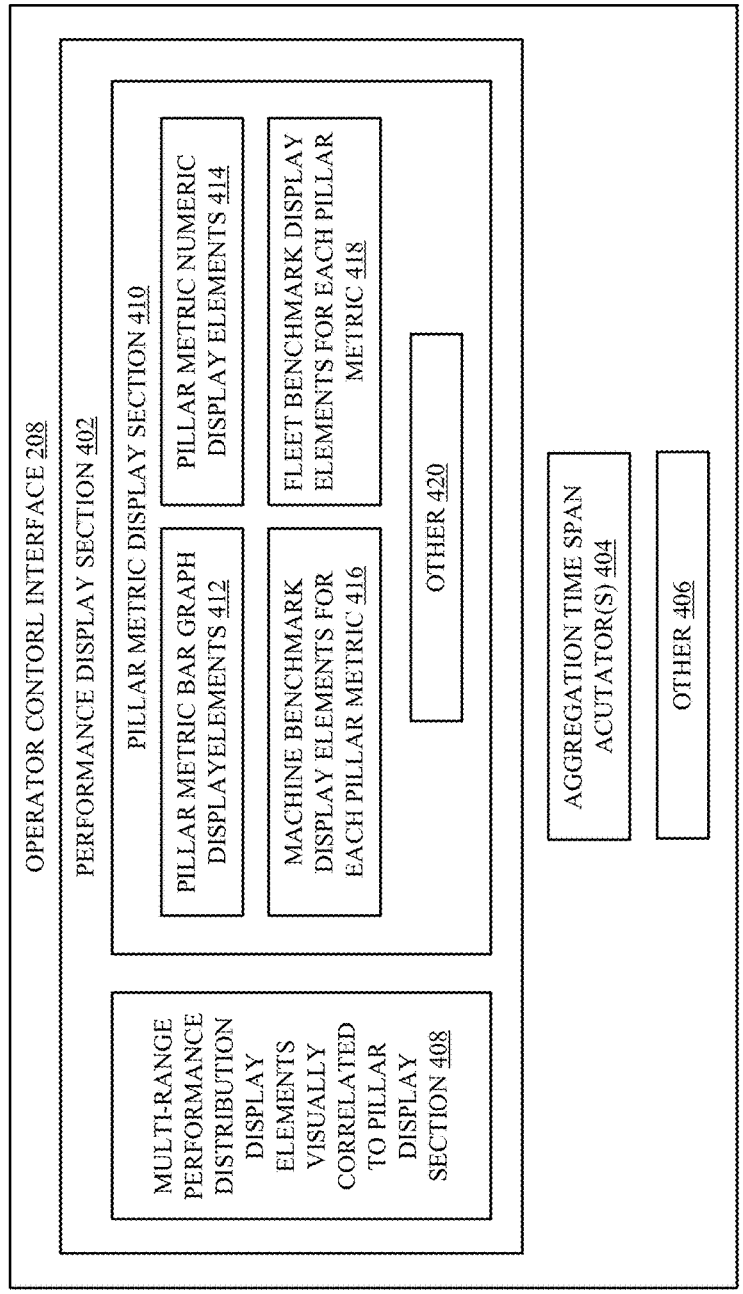
FIG. 10 is a block diagram of one example of an operator control interface that can be generated on the combine harvester illustrated in FIGS. 1 and 2.

FIG. 10 is a block diagram of one example of an operator control interface display 208. Display 208 illustratively includes performance display section 402, aggregation time span actuators 404, and it can include a wide variety of other items 406. Performance display section 402 illustratively includes multi-range performance distribution display elements 408 that are visually correlated to a pillar metric display section 410. Pillar metric display section 410 illustratively includes, for each performance pillar, bar graph display elements 412, numeric display elements 414, machine performance display elements 416, and fleet benchmark display elements 418, for each pillar metric. It can include other items 420 as well. The display elements 408, 412, 414, 416, and 418 are similar to those shown on the remote user control interface display 216. However, instead of displaying the display elements for multiple different machines, the operator control interface display 208 only shows the display elements for the machine that the display 402 is displayed on.

Figure 11A:
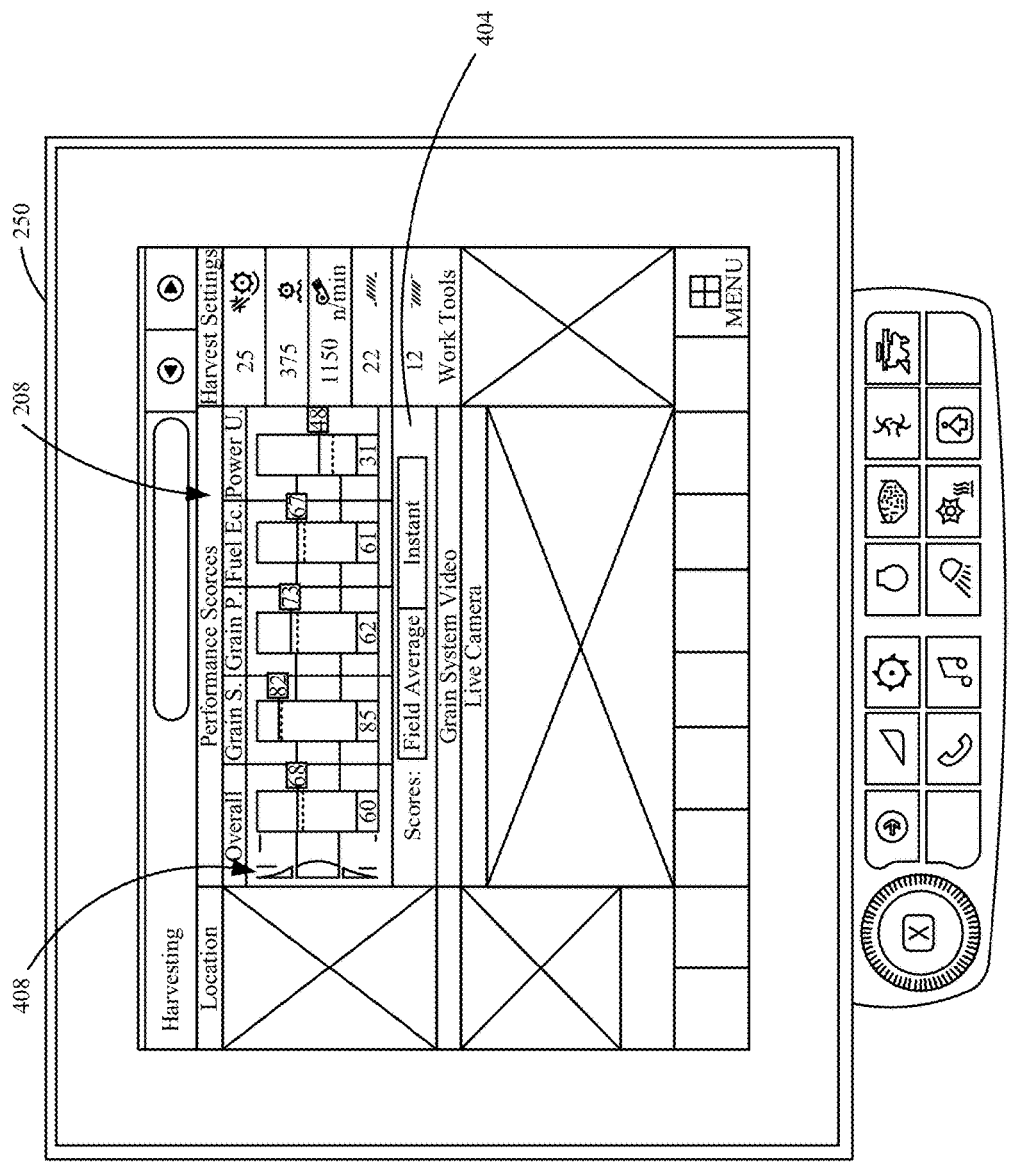
FIGS. 11A-11C show various examples of an operator control interface.
Figures 11B, 11C:
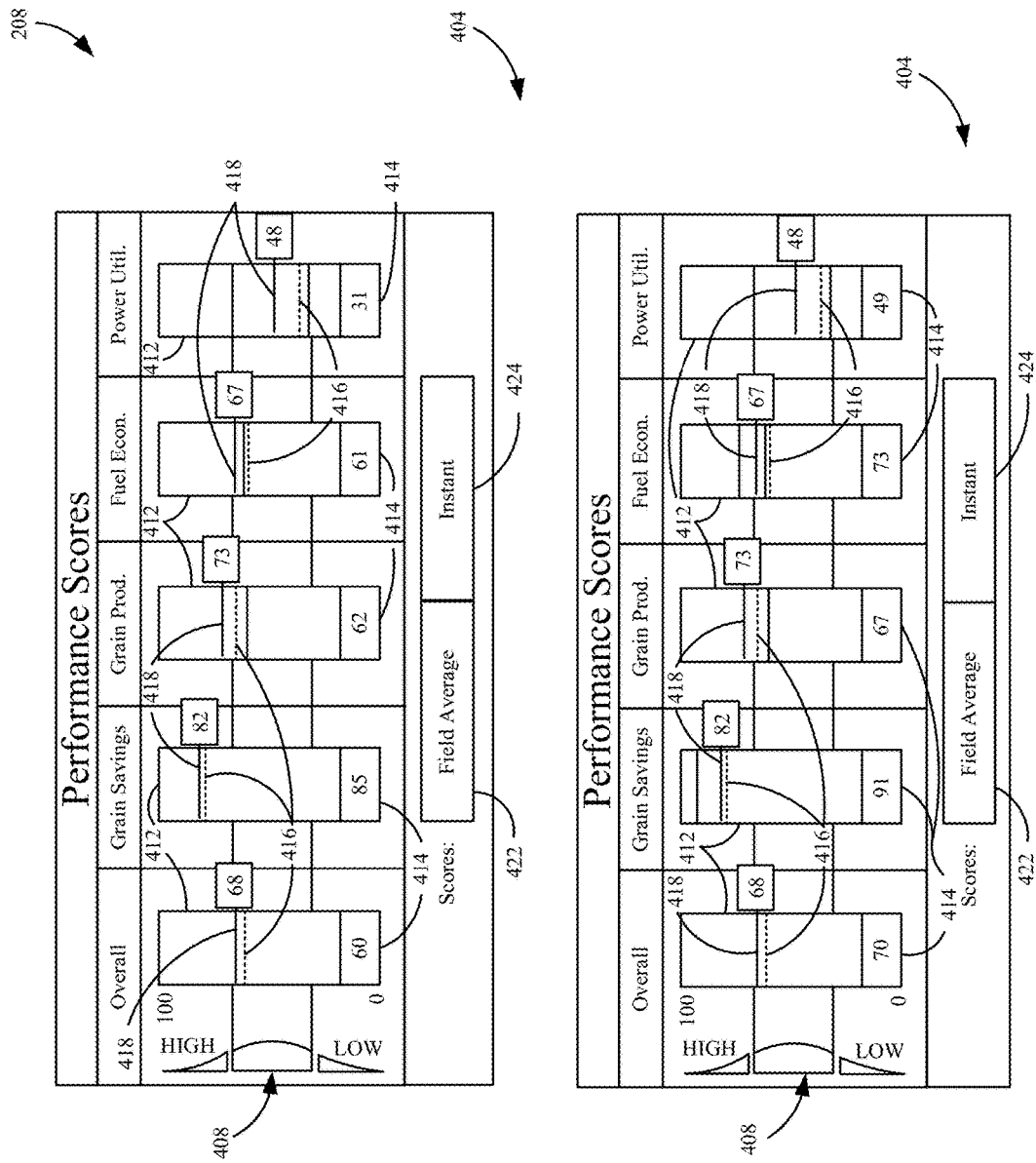

FIGS. 11A-11C show more detailed examples of this. FIG. 11A shows a display device 250 that can reside in the operator compartment of the combine 100. FIG. 11B shows a portion of the display shown in FIG. 11A in an enlarged view, for the sake of clarity. The display device 250 generates a user interface display 208. At least part of the user interface display 208 includes the multi-range performance distribution display elements 408 which, similar to display elements 338 shown in FIGS. 7A and 7B, are shown as a bell curve divided into high, average, and low performance ranges. The display device is controlled so that shading is extended across the bar graphs in the remainder of the display so that the value of the bar graphs can easily be identified as being in the high, medium or low performance distribution ranges.

In the example shown in FIG. 11A, aggregation time span actuators 404 illustratively include a field average actuator 422 and an instant actuator 424. When the user actuates the field average actuator 422, the display illustrated in FIG. 11A is generated. This shows the average values for a current field being harvested. However, when the user actuates the instant actuator 424, a display such as display 426, shown in FIG. 11C is generated. Display 426 is similar to display 208 shown in FIGS. 11A and 11B, except that the values illustrated thereon for bar graphs 412, numeric values 414, fleet benchmark values 418 and machine benchmark display elements 416 are all the instantaneous values (or the values generated in near real time), instead of the average values over the entire field.

Figure 12:
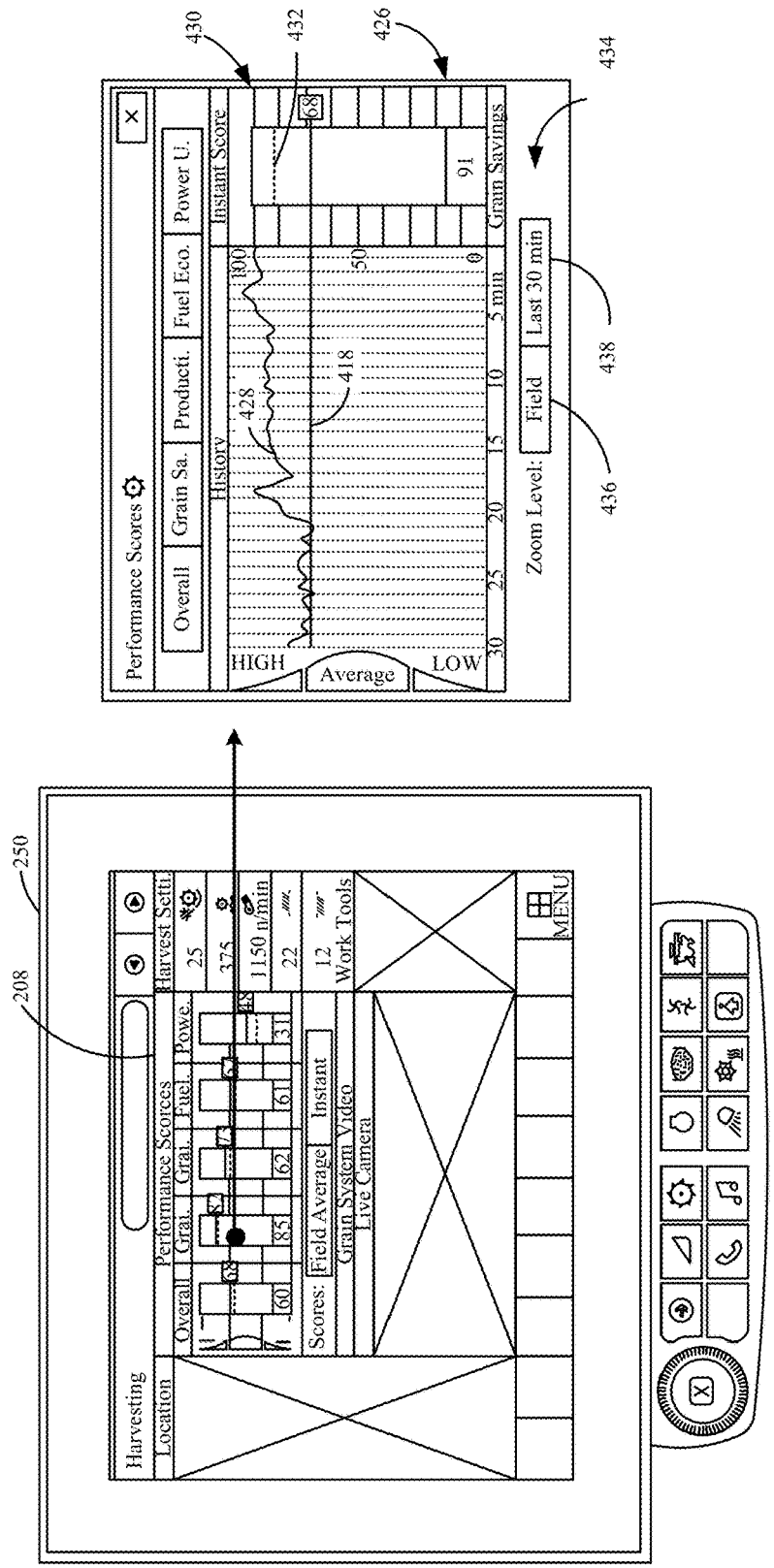
FIG. 12 shows one example of user interaction with an operator control interface.

FIG. 12 shows one example of a trend user interface display 426. Display 426 can be generated from display 208, for instance, when the user taps or otherwise actuates one of the bar graph display elements for one of the performance metrics illustrated on display 208. When that occurs, display 426 can be overlaid, or otherwise displayed on display device 250. It can be seen in FIG. 12, that the user has actuated the bar graph corresponding to the "grain savings" performance category. In that case, display 426 shows a fleet benchmark value 418, for the "grain savings" performance metric, along with a trend display element 428 that shows the values of the "grain savings" performance criteria generated for the machine on which the display is generated, over a recent time span. In the example shown in FIG. 12, it is over the last 30 minutes. Display 426 also includes an instant metric display section 430 that displays a bar graph and numerical value for an instant value (or near real time value) of the "grain savings" performance metric, along with the machine benchmark display element 432. A set of zoom level actuators 434 include a field actuator 436 that allows the operator to view the trend display elements 418 and 428 that aggregate and show information over the entire field being harvested, and a last 30 minutes actuator 438 that allows the operator to view those values over the last 30 minutes. It will be noted of course that 30 minutes is just one example and other time spans can be used as well.

Figure 13A:
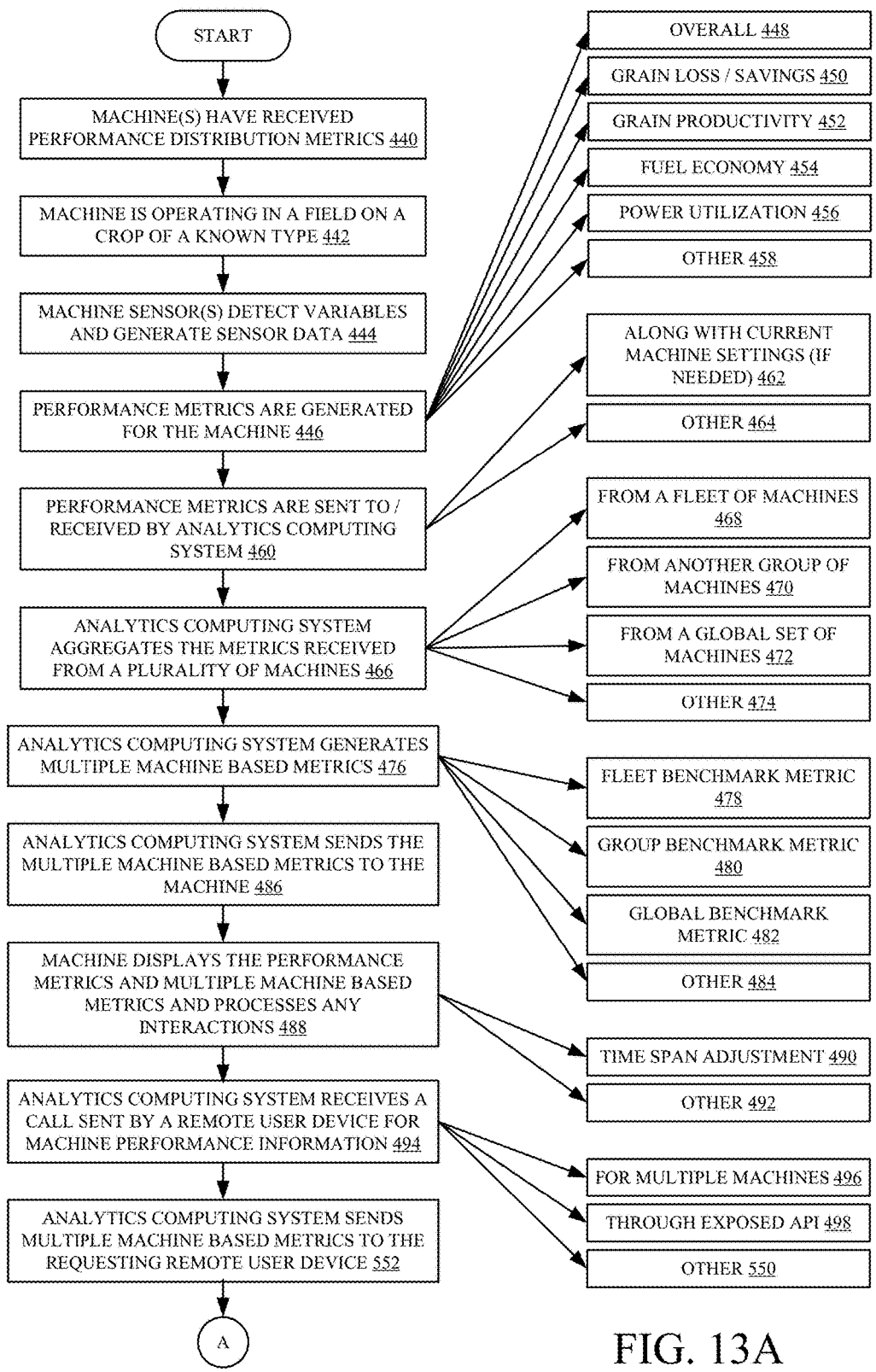
FIGS. 13A and 13B (collectively referred to herein as FIG. 13) show one example of the operation of the architecture shown in FIG. 2 in generating control user interfaces for user interaction.
Figure 13B:
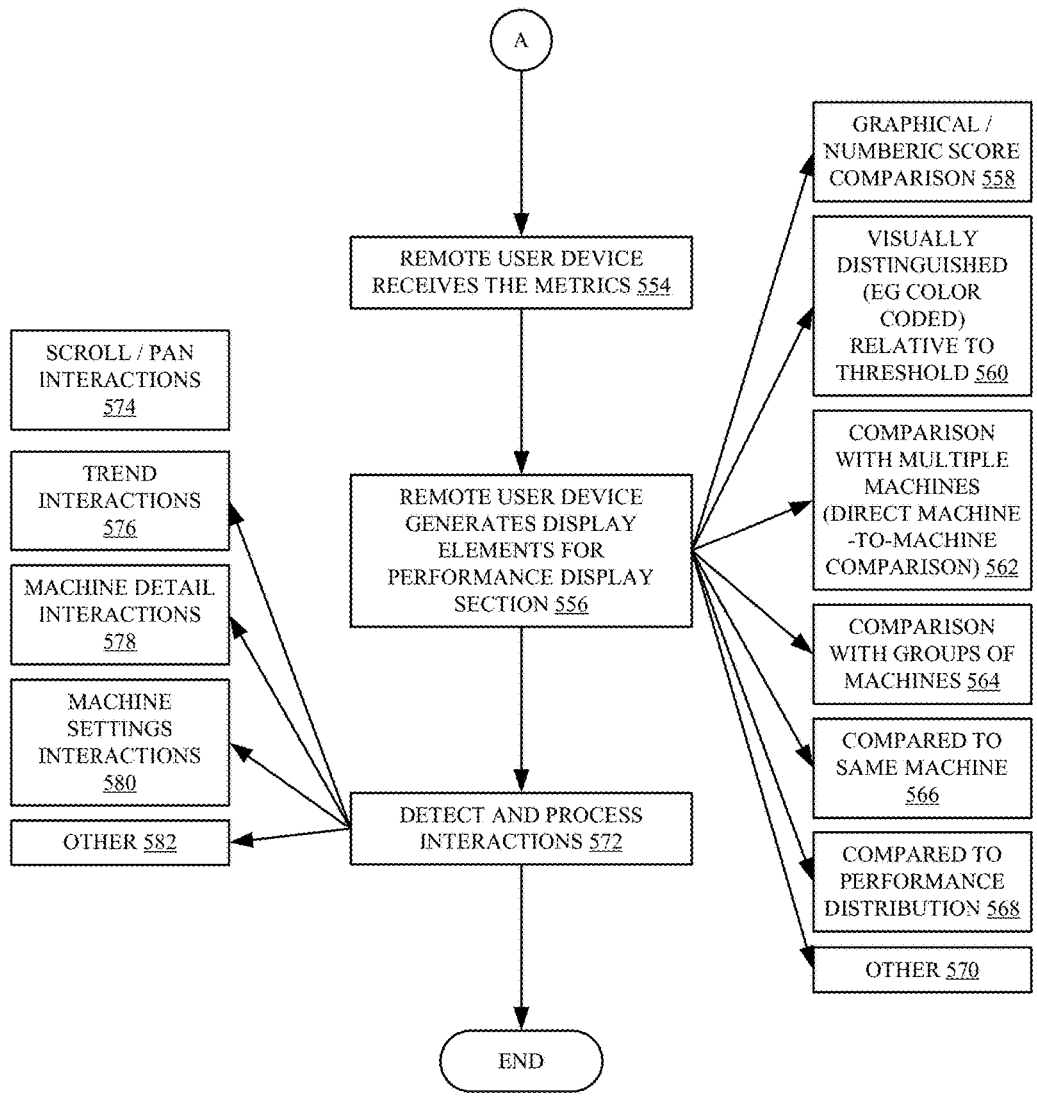

FIGS. 13A and 13B (collectively referred to herein as FIG. 13) illustrate a flow diagram showing one example of the operation of architecture 100, illustrated in FIG. 2, in controlling display devices to generate the various user interface displays, detecting user interaction, and performing control operations and other processing based on that user interaction.

It is first assumed that the combine 100 has received performance distribution metrics that can be reflected by performance distribution display elements 408 to the operator 212 of the machine. In one example, this can be generated by remote analytics logic 262 and communicated to the application being run by application running logic 228 on combine 100 so that it can be displayed to operator 212. Having the machine receive performance distribution metrics is indicated by block 440 in the flow diagram of FIG. 13.

It is also assumed, for the sake of describing FIG. 13, that the combine 100 is operating in a field on a crop of a known crop type (such as wheat, soybeans, etc.). This is indicated by block 442.

Sensors 246 then sense a variety of different variables, such as operating characteristics of combine 100, machine settings, environmental characteristics, crop characteristics, etc. Having the machine sensors 246 sense the variables and generate sensor data is indicated by block 444 in the flow diagram of FIG. 13.

Performance metric generator logic 242 then generates performance metrics for combine 100. This is indicated by block 446. In one example, the performance metrics correspond to the different performance categories or performance pillars described above. Thus, the performance metrics can reflect the performance of combine 100 along those different pillars (grain loss/savings, grain productivity, fuel economy, power utilization, and an overall metric). Others can be generated as well. The overall metric is indicated by block 448. The grain loss/savings metric is indicated by block 450. The grain productivity metric is indicated by block 452. The fuel economy metric is indicated by block 454. The power utilization metric is indicated by block 456, and a variety of other performance metrics can be generated as well, as indicated by block 458.

The application running on combine 100 then controls communication system 234 to send the performance metrics generated for combine 100 to the remote analytics computing system 202, where they may be received through the exposed API 263 or in another way. This is indicated by block 460. In one example, the performance metrics can be sent along with the current machine settings as indicated by block 462. The machine settings can be sent ahead of time, or in other ways as well. This is indicated by block 464.

Multi-machine aggregation logic 304 in analytics logic 262 then aggregates the metrics received from a plurality of different combines. This is indicated by block 466 in the flow diagram of FIG. 13. The data can be aggregated across different groups or different levels of groups. For instance, it can be aggregated across a plurality of machines from a fleet of machines owned or operated by a single organization. This is indicated by block 468. It can be aggregated across another group of machines as indicated by block 470. It can be aggregated across a global set of machines including all machines that access remote analytics logic 262, across an entire geographic region, a country, or in the world, that are currently operating on the same type of crop. Aggregating across a global set of combines is indicated by block 472. The data can be aggregated in other ways as well, and this is indicated by block 474.

The analytics logic 262 then generates multiple machine-based metrics, that is, metrics based on data from multiple combines. This is indicated by block 476. For instance, fleet benchmark generator logic 306 illustratively aggregates data from a fleet of combines (or filters the data to obtain that for the fleet) and generates the fleet benchmarks 478. Group benchmark generator logic 308 illustratively aggregates data from a group of combines (or filters the data to obtain that for the groups) and generates the group benchmark metric 480. Global benchmark generator logic 310 aggregates data from a global set of combines (or filters the data to obtain that for the global set) and generates the global benchmark metric 482. Other metrics based on data from multiple combines can be generated as well, and this is indicated by block 484.

The remote analytics logic 262 then illustratively controls communication system 266 to send the multiple machine-based metrics to combine 100 where it can be displayed to operator 212, as described above. This is indicated by blocks 486 and 488. The timespan actuators are indicated by block 490. The metrics can be displayed in other ways as well, as indicated by block 492.

There may illustratively be a plurality of different remote managers or remote users 220 that can access remote analytics computing system 202. In one example, an application run by application running logic 274 generates a display that allows remote user 220 to access data from remote analytics computing system 202 so that remote user 220 can see a comparison among a variety of different combines to which the remote user 220 has access. In doing so, the application on remote user device 204 can generate a request for machine performance information. This is indicated by block 494 in the flow diagram of FIG. 13. The request can be to request performance information for multiple machines associated with remote user 220 (such as machines that the user is authorized to view). Thus, remote analytics computing system 202 may execute authentication processing to authenticate remote user 220 and to identify the particular set of machines for which the user 220 is authorized to access information. Requesting information for multiple machines is indicated by block 496. The request can be made by calling exposed API 263 as indicated by block 498, or in a wide variety of other ways, as indicated by block 550.

Based on the request, remote analytics logic 260 aggregates information for the set of machines for which the request was received, and sends the multiple machine-based metrics for the request to the requesting user device 204. This is indicated by block 552 in FIG. 13. The various communication systems 234, 266 and 276 can also be configured to establish a secure communication link between remote user 220 and operator 212. This can go through system 202 or be direct between system 204 and combine 100.

The remote user device 204 receives the metrics. In one example, the application run by application running logic 274 receives the metrics through API 263. They can be received in other ways as well. Receiving the metrics is indicated by block 554 in the flow diagram of FIG. 13.

The application then controls user interface logic 278, and display generator logic 280, to generate display elements for the performance display section on user interface display 216. This is indicated by block 556 in the flow diagram of FIG. 13. The display elements illustratively include graphic/numeric metric comparison data as indicated by block 558. Bar graphs or other graphical elements can be visually distinguished (e.g., color-coded) based on how they relate to a particular threshold. This is indicated by block 560.

The comparison display illustratively displays data from multiple machines in a direct machine-to-machine comparison. This is indicated by block 562. For instance, in one example, the bar graphs or display elements corresponding to each performance pillar, and corresponding to each machine, are displayed adjacent one another. Therefore, the remote user 220 can quickly determine how the machines compare to one another, on each performance pillar. Display elements are generated reflecting a comparison with different groups of combines as indicated by block 564, as compared to historical information for the same combine as indicated by block 556, and as compared to a set of performance distribution ranges, as indicated by block 568.

The other sections of the display can be generated as well, and this is indicated by block 570.

Interaction processing logic 282 then detects and processes any user interactions with the displayed interface. This is indicated by block 572 in FIG. 13. For instance, it may be that remote user 220 provides a scrolling or panning input to pan or scroll the display so that different performance pillars can be viewed as discussed above with respect to FIGS. 8 and 9. Scrolling and panning interaction processing is indicated by block 574 in the flow diagram of FIG. 13.

User 220 may provide an input indicating that the user wishes to review trend information. In that case, the application controls communication system 276 to obtain trend values, and generates the trend display elements based on the trend interactions detected. This is indicated by block 576.

It may be that user 220 actuates the machine details actuator 376. In that case, the application running on user device 204 illustratively accesses the machine details and navigates user 220 to a display (or generates a pop-up display) populated with the machine details. It can establish communication with combine 100 to obtain near real time sensor signal values, or other values as well. Processing machine detail interactions is indicated by block 578.

The user 220 may actuate the machine settings actuator 392. In that case, the application illustratively navigates the user through a user experience that allows user 220 to view current machine settings for combine 100 and to make changes to the machine settings for combine 100. The application then controls the communication system 276 to send the adjusted machine settings to the operator 212 of combine 100 so they can be either accepted, and applied, or rejected by operator 212. Performing processing based on machine settings interactions is indicated by block 580. Detecting and processing user interactions can be performed in a wide variety of other ways as well, and this is indicated by block 582.

It will be noted that, during the displaying of the performance metrics and comparison data, the sensors 246 on combine 100 continue to sense the variables and generate sensor signals indicative of the sensed variables. The display generator logic 280 then updates the performance metrics, and provides the updated performance metrics to remote analytics computing system 202. Remote analytics logic 262 updates the various metrics that it generates, and provides the indications of those metrics back to combine 100, and to remote manager computing system 204. Display generator logic 280 updates the display elements, such as by modifying the height of the bar graphs, and the various metric display elements on display 216, based on the modified information received. The modifications can be received in near real time, periodically or otherwise intermittently, or in a variety of other ways. Further, where combine 100 loses its communication link with computing system 202 and/or system 204, communication system 234 illustratively stores data to be communicated in data store 232. When communication is re-established, the stored data can then be sent and transmission of near real time data can be commenced as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 14:
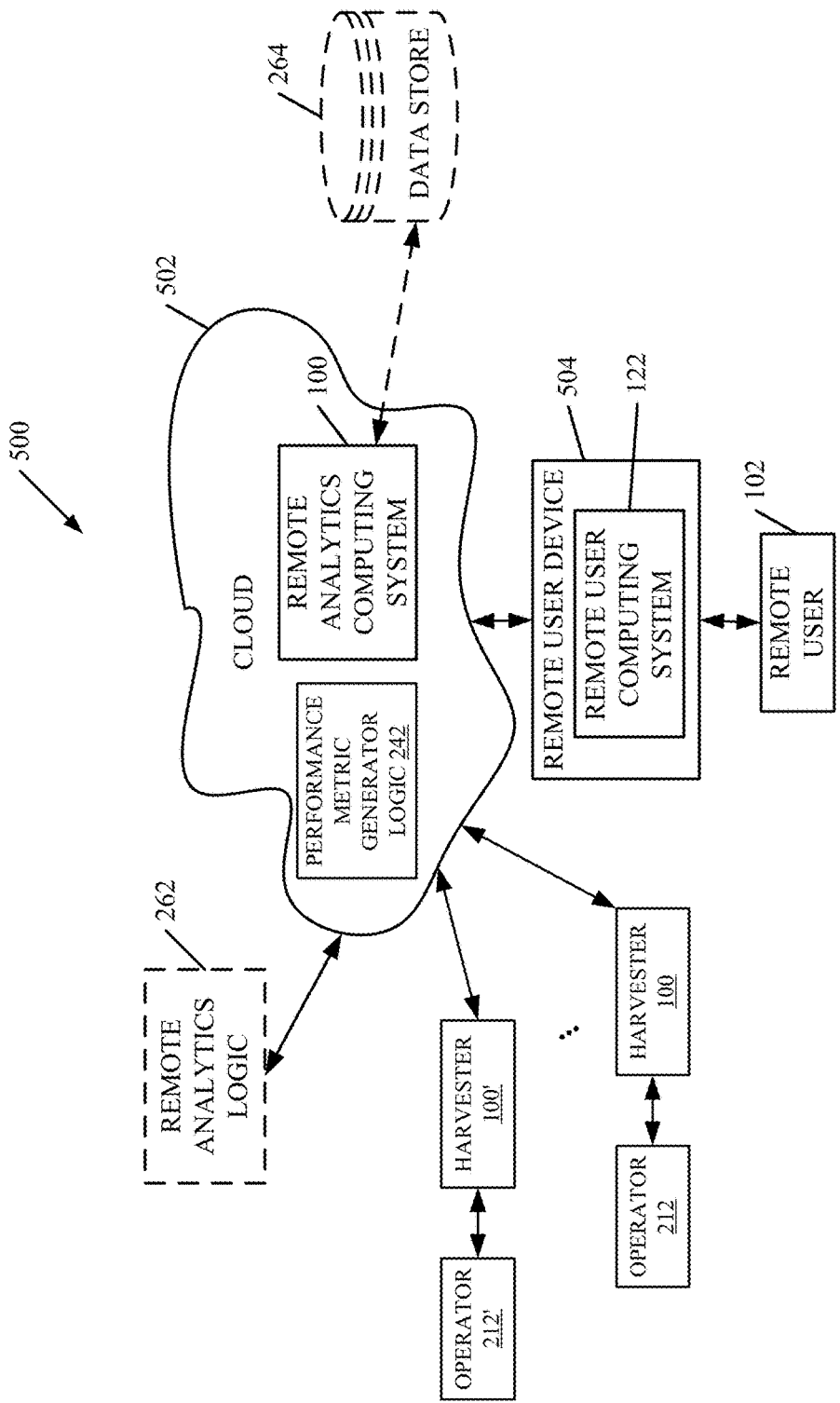
FIG. 14 shows one example of the architecture illustrated in FIG. 2, deployed in a remote server environment.

FIG. 14 is a block diagram of the architecture 200, shown in FIG. 2, except that it communicates with elements in a remote server architecture 500. In an example, remote server architecture 500 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown in FIG. 2 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 14, some items are similar to those shown in FIG. 2 and they are similarly numbered. FIG. 14 specifically shows that the architecture can include a plurality of combines 100-100' each with its own local operator 212-212'. FIG. 14 also shows that remote analytics computing system 202 can be located at a remote server location 502. Therefore, combines 100-100' and remote user computing system 204 access those systems through remote server location 502.

FIG. 14 also depicts another example of a remote server architecture. FIG. 14 shows that it is also contemplated that some elements of FIG. 2 are disposed at remote server location 502 while others are not. By way of example, performance metric generator logic 242 can be disposed in system 202 instead of, or in addition to, being on the combines. It can communicate the performance metrics to the combines, to remote user computing system 204 or to other systems. Remote analytics logic 262 and data store 264 can be disposed at a location separate from location 502, and accessed through the remote server at location 502. Regardless of where they are located, they can be accessed directly by combine 100, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the combine comes close to the fuel truck for fueling, the system automatically collects the information from the harvester using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the combine until the combine enters a covered location. The combine, itself, can then send the information to the main network.

It will also be noted that the elements of FIG. 2, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 15:
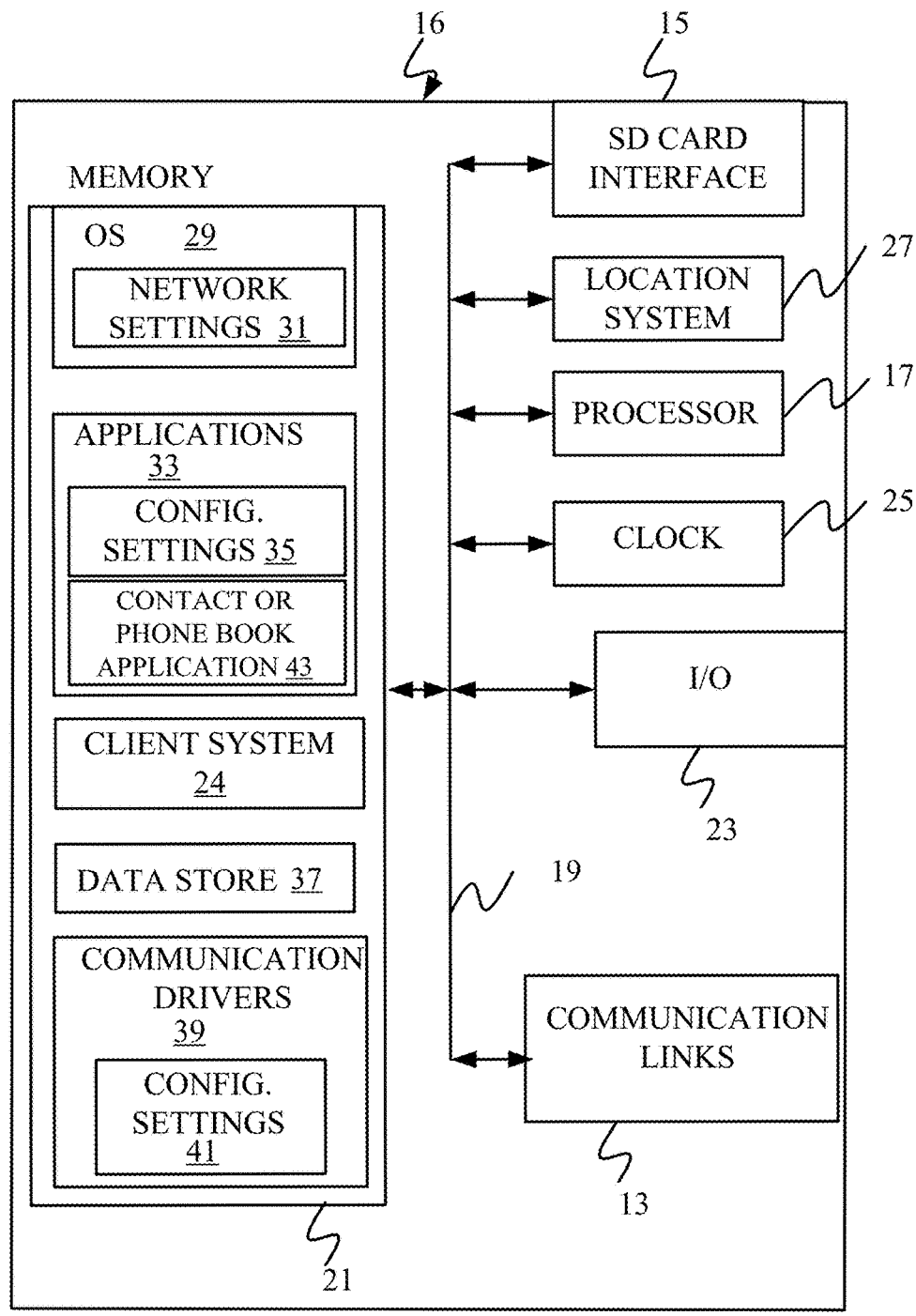
FIGS. 15-17 show examples of mobile devices that can be used in the architectures shown in the previous FIGS.
Figure 16:
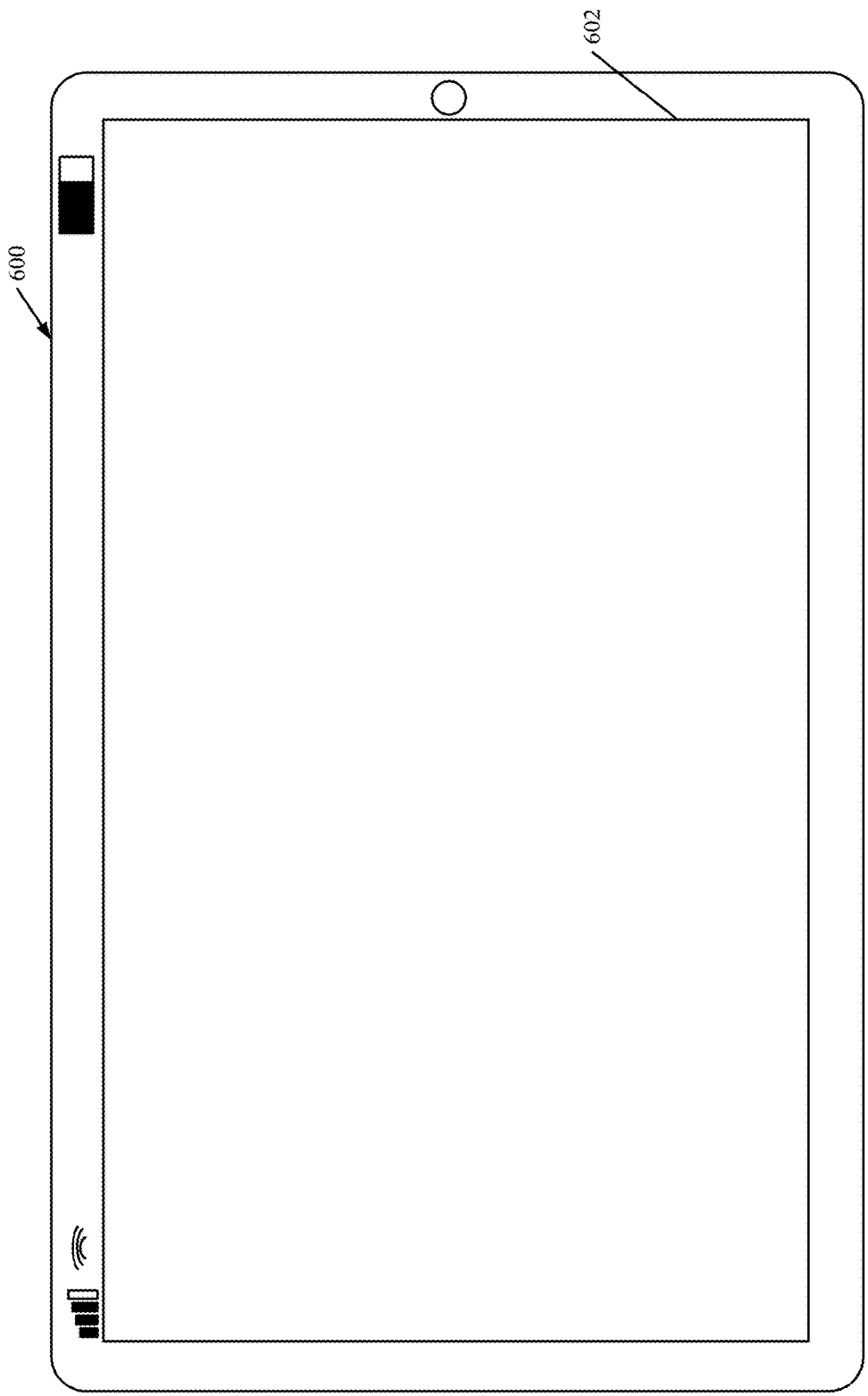
Figure 17:
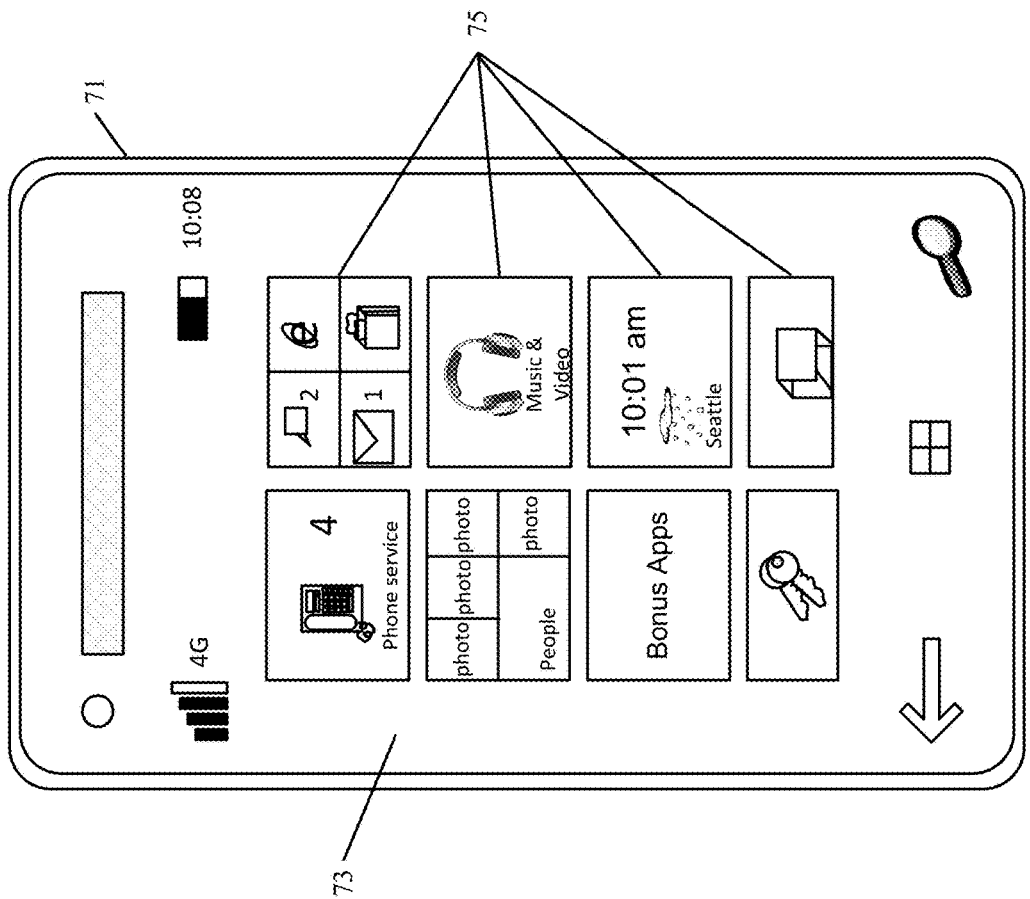

FIG. 15 is a simplified block diagram of one illustrative example of a handheld or mobile computing device that can be used as a user's or client's hand held device 16, in which the present system (or parts of it) can be deployed. For instance, a mobile device can be deployed as remote user computing system 202 in the operator compartment of combine 100 for use in generating, processing, or displaying the information discussed herein and in generating the control interface. FIGS. 16-17 are examples of handheld or mobile devices.

FIG. 15 provides a general block diagram of the components of a client device 16 that can run some components shown in FIG. 2, that interacts with them, or both. In the device 16, a communications link 13 is provided that allows the handheld device to communicate with other computing devices and in some examples provide a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 16 shows one example in which device 16 is a tablet computer 600. In FIG. 16, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 17 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 18:
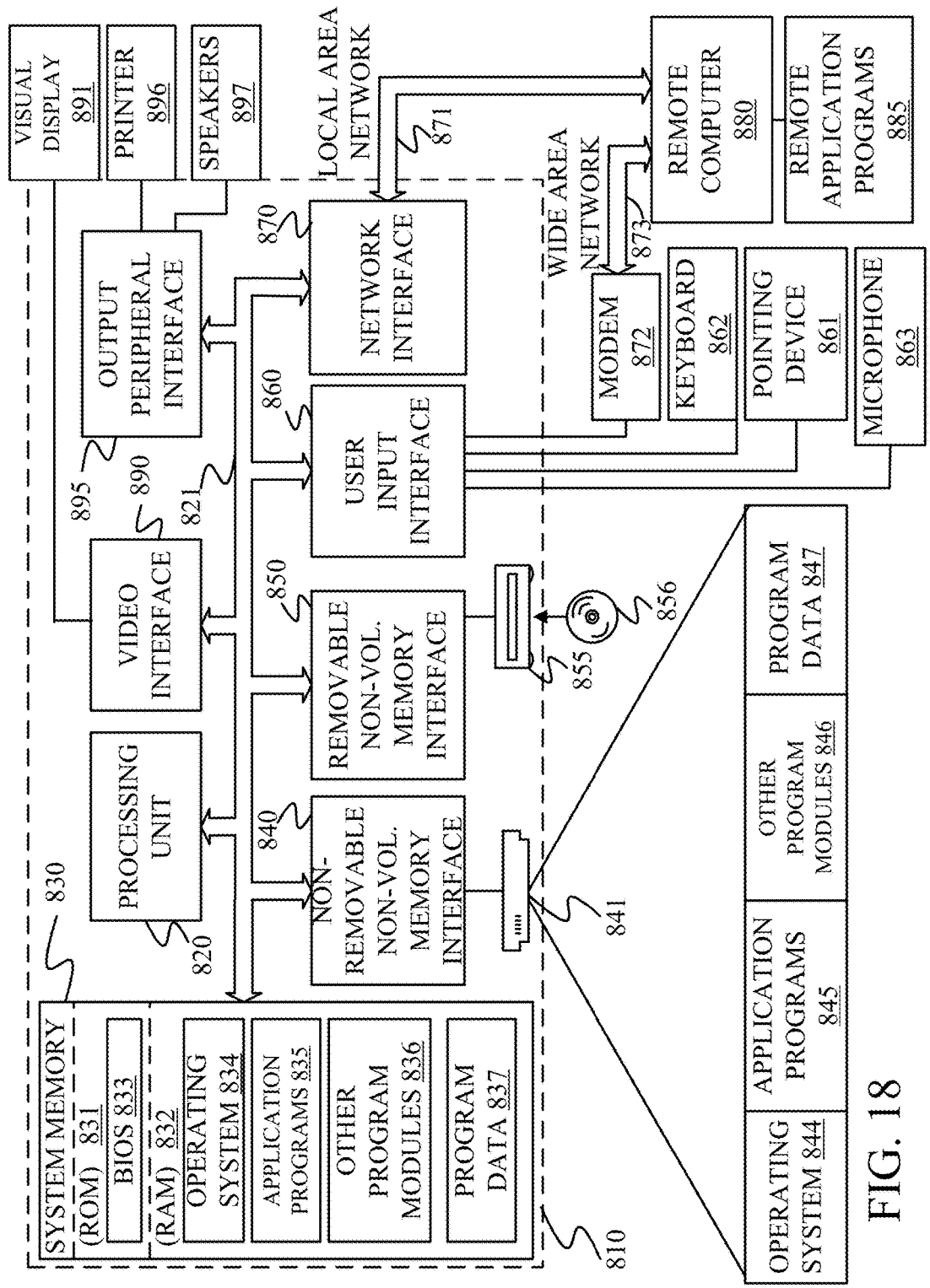
FIG. 18 is a block diagram showing one example of a computing environment that can be used in the architectures shown in the previous figures.

FIG. 18 is one example of a computing environment in which elements of FIG. 2, or parts of it, (for example) can be deployed. With reference to FIG. 18, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 2 can be deployed in corresponding portions of FIG. 18.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 18 illustrates operating system 834, application programs 835, other program modules 836, and program data 837.

The computer 810 may also include other removable/non-removable volatile/nonvolatile computer storage media. By way of example only, FIG. 18 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 18, provide storage of computer readable instructions, data structures, program modules and other data for the computer 810. In FIG. 18, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 18 illustrates, for example, that remote application programs 885 can reside on remote computer 880.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
   a machine control interface that includes a machine selection actuator that is actuatable to select a set of remote agricultural harvesting machines;
   a communication system configured to obtain a set of machine performance metrics indicative of performance of the set of remote harvesting machines, machine benchmark values from a remote analytics computing system indicative of benchmark values corresponding to each machine performance metric, and a performance distribution indicative of a distribution of performance across the set of machine performance metrics;
   one or more processor(s), one of the one or more processor(s) configured to generate a separate graphical performance metric display element corresponding to each machine performance metric in the set of machine performance metrics, for each agricultural harvesting machine, in the set of remote agricultural harvesting machines, one of the one or more processor(s) being configured to generate a graphical distribution display element indicative of the performance distribution, and graphical benchmark display elements corresponding to the machine benchmark values;
   wherein one of the one or more processor(s) is configured to generate the graphical distribution display element as a divided bell curve shaped display element, which is visually divided into sections;
   a display device;
   display generator logic, implemented by one of the one or more processor(s), configured to control the display device to display, on the machine control interface, a performance metric display section corresponding to each of the machine performance metrics, each performance metric display section displaying:
      the graphical performance metric display elements for the machine performance metric corresponding to the performance metric display section, for each agricultural harvesting machine in the set of agricultural harvesting machines, adjacent one another;
      the graphical benchmark display element corresponding to the machine benchmark value for the performance metric corresponding to the performance metric display section;
      the display generator logic further controlling the display device to extend a portion of the graphical distribution display element across the graphical performance metric display elements in the performance metric display sections visible on the display device;
   wherein the display generator logic is configured to detect a user scroll gesture on the performance metric display section and to control the display device to scroll the display of the performance metric display sections; and
   wherein the display generator logic is configured to display the divided bell curve shaped display element along one side of the performance metric display section, in a fixed position on the display device as the performance metric display sections being displayed on the display device are scrolled.

2. The computing system of claim 1 wherein one of the one or more processor(s) is configured to generate, as the graphical performance metric display elements, a bar graph for each machine performance metric and for each machine in the set of remote agricultural harvesting machines.

3. The computing system of claim 2 wherein the display generator logic is configured to control the display device to display, in each performance metric display section, the bar graphs, for the corresponding machine performance metric and for each machine in the set of remote agricultural harvesting machines, adjacent one another.

4. The computing system of claim 3 wherein the display generator logic is configured to control the display device to display the graphical benchmark display element, corresponding to each machine performance metric, as a line segment across a portion of the bar graph for the corresponding machine performance metric.

5. The computing system of claim 3 wherein one of the one or more processor(s) is configured to generate a separate numeric performance metric display element corresponding to each machine performance metric in the set of machine performance metrics, for each machine in the set of remote agricultural harvesting machines.

6. The computing system of claim 5 wherein the display generator logic is configured to control the display device to display, in each performance metric display section, the numeric performance metric display element, for the corresponding machine performance metric and for each machine in the set of remote agricultural harvesting machines.

7. The computing system of claim 3 wherein one of the one or more processor(s) is configured to generate a group graphical benchmark display element corresponding to each machine performance metric and indicative of a benchmark value for the corresponding machine performance metric obtained based on information from a group of remote agricultural harvesting machines.

8. A computer implemented method, comprising:
   generating a machine control interface that includes a machine selection actuator that is actuatable to select a set of remote agricultural harvesting machines;

detecting actuation of the machine selection actuator to identify a set of remote agricultural harvesting machines;

controlling a communication system to obtain a set of machine performance metrics indicative of performance of the set of remote agricultural harvesting machines, machine benchmark values from a remote analytics computing system indicative of benchmark values corresponding to each machine performance metric, and a performance distribution indicative of a distribution of performance across the machine performance metrics;

generating a separate graphical performance metric display element corresponding to each machine performance metric in the set of machine performance metrics, for each agricultural harvesting machine, in the selected set of remote agricultural harvesting machines;

generating a graphical distribution display element indicative of the performance distribution;

generating graphical benchmark display elements corresponding to the machine benchmark values;

controlling a display device to display, on the machine control interface, a performance metric display section corresponding to each of the machine performance metrics, each performance metric display section displaying:

the graphical performance metric display elements for the machine performance metric corresponding to the performance metric display section, for each agricultural harvesting machine in the set of agricultural harvesting machines, adjacent one another; and the graphical benchmark display element corresponding to the machine benchmark value for the performance metric corresponding to the performance metric display section;

controlling the display device to extend a portion of the graphical distribution display element across the graphical performance metric display elements in the performance metric display sections visible on the display device;

detecting a user scroll gesture on a performance metric display section; and controlling the display device to scroll the display of the performance metric display sections; and wherein generating the graphical distribution display element comprises:

generating the graphical distribution display element as a divided bell curve shaped display element, which is visually divided into sections, wherein controlling the display device to display the graphical distribution display element comprises displaying the divided bell curve shaped display element along one side of the performance metric display section, in a fixed position on the display device as the performance metric display sections being displayed on the display device are scrolled.

9. The computer implemented method of claim 8 wherein generating a separate graphical performance metric display element corresponding to each machine performance metric comprises:

generating, as the graphical performance metric display elements, a bar graph for each machine performance metric and for each machine in the set of remote agricultural harvesting machines.

10. The computer implemented method of claim 9 wherein controlling the display device to display a performance metric display section corresponding to each of the machine performance metrics comprises:

controlling the display device to display, in each performance metric display section, the bar graphs, for the corresponding machine performance metric and for each machine in the set of remote agricultural harvesting machines, adjacent one another.

11. The computer implemented method of claim 10 wherein controlling the display device to display the graphical benchmark display element comprises:

controlling the display device to display the graphical benchmark display element, corresponding to each machine performance metric, as a line segment across a portion of the bar graph for the corresponding machine performance metric.

12. The computer implemented method of claim 10 and further comprising:

generating a separate numeric performance metric display element corresponding to each machine performance metric in the set of machine performance metrics, for each machine in the set of remote agricultural harvesting machines and wherein controlling the display device to display a performance metric display section corresponding to each of the machine performance metrics comprises controlling the display device to display, in each performance metric display section, the numeric performance metric display element, for the corresponding machine performance metric and for each machine in the set of remote agricultural harvesting machines.

13. The computer implemented method of claim 10 and further comprising:

generating a group graphical benchmark display element corresponding to each machine performance metric and indicative of a group benchmark value for the corresponding machine performance metric obtained based on information from a group of remote agricultural harvesting machines, and wherein controlling the display device to display a performance metric display section corresponding to each of the machine performance metrics comprises controlling the display device to display the group graphical benchmark display element, corresponding to each machine performance metric, as a line segment across a portion of the bar graph for the corresponding machine performance metric.

* * * * *